United States Patent
Zhang et al.

(10) Patent No.: US 12,355,980 B2
(45) Date of Patent: Jul. 8, 2025

(54) ANTI-TEARING PICTURE PROCESSING METHOD AND APPARATUS

(71) Applicant: Huawei Technologies Co., Ltd., Shenzhen (CN)

(72) Inventors: Yixuan Zhang, Singapore (SG); Shaolin Chen, Shenzhen (CN); Lin Meng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 18/147,402

(22) Filed: Dec. 28, 2022

(65) Prior Publication Data
US 2023/0171408 A1     Jun. 1, 2023

Related U.S. Application Data

(63) Continuation of application No. PCT/CN2020/099585, filed on Jun. 30, 2020.

(51) Int. Cl.
| | | |
|---|---|---|
| *H04N 19/157* | (2014.01) | |
| *H04N 19/105* | (2014.01) | |
| *H04N 19/172* | (2014.01) | |
| *H04N 19/30* | (2014.01) | |
| *H04N 19/423* | (2014.01) | |
| *H04N 19/463* | (2014.01) | |
| *H04N 19/87* | (2014.01) | |

(52) U.S. Cl.
CPC ......... *H04N 19/157* (2014.11); *H04N 19/105* (2014.11); *H04N 19/172* (2014.11); *H04N 19/30* (2014.11); *H04N 19/423* (2014.11); *H04N 19/463* (2014.11); *H04N 19/87* (2014.11)

(58) Field of Classification Search
CPC .. H04N 19/157; H04N 19/105; H04N 19/172; H04N 19/423; H04N 19/463; H04N 19/87
See application file for complete search history.

(56) References Cited

U.S. PATENT DOCUMENTS

2013/0230108 A1* 9/2013 Leannec ............... H04N 19/895
                                                                    375/240.12
2016/0227257 A1* 8/2016 Frishman ............... H04N 19/65

FOREIGN PATENT DOCUMENTS

CN          111093083 A      5/2020

OTHER PUBLICATIONS

ITU-T H.264, Advanced video coding for generic audiovisual services, Series H: Audiovisual and Multimedia Systems Infrastructure of audiovisual services-Coding of moving video, Jun. 2019(Jun. 2019), total 836 pages.

(Continued)

*Primary Examiner* — James T Boylan
(74) *Attorney, Agent, or Firm* — Conley Rose, P.C.

(57) ABSTRACT

In a picture processing method, when receiving a first picture in a video stream, a decoder side determines, based on a base layer of the 1st sub-picture of the first picture, whether the first picture meets a first preset condition; and the decoder side sends a second picture within a display time period of the first picture for displaying if the first picture meets the first preset condition, where the second picture is a picture that is in the video stream and that is sent within a first display time period for displaying.

20 Claims, 11 Drawing Sheets

(56) References Cited

OTHER PUBLICATIONS

ITU-T H.265, High efficiency video coding, Series H: Audiovisual and Multimedia Systems Infrastructure of audiovisual services—Coding of moving video, Nov. 2019(Nov. 2019), total 712 pages.
Information technology High efficiency coding and media delivery in heterogeneous environments Part 2: High efficiency video coding, ISO/IEC 23008-2, Dec. 1, 2013, total 13 pages.

* cited by examiner

ANTI-TEARING PICTURE PROCESSING METHOD AND APPARATUS

CROSS-REFERENCE TO RELATED APPLICATIONS

This application is a continuation of International Patent Application No. PCT/CN2020/099585, filed on Jun. 30, 2020, the disclosure of which is hereby incorporated by reference in its entirety.

TECHNICAL FIELD

Embodiments of the present disclosure relate to the field of picture processing, and in particular, to a picture processing method and apparatus.

BACKGROUND

With development of electronic technologies, there are more types of electronic devices available for users. Some electronic devices have strong processing capabilities in graphics rendering, encoding, and the like on a video picture, while other electronic devices have good display effect on the video picture. To obtain better video experience, an electronic device with a strong processing capability may be used as a source device, and send, in a wireless transmission mode, an encoded video picture to a destination device with good display effect for displaying. For example, a mobile phone or a watch may project a video stream to a television in a wireless transmission mode for picture displaying.

In a wireless transmission process, to reduce a delay, a system can use a sub-frame-level picture processing mode for processing. To be specific, the source device may divide a frame of picture into a plurality of sub-pictures and then sequentially encode and transmit all of the sub-pictures, and the destination end sequentially performs processing such as decoding and displaying on all of the sub-pictures. A sub-picture is displayed immediately after the destination device decodes the sub-picture each time, to reduce a system delay as much as possible. Each of the sub-pictures may include a base layer and at least one enhancement layer. The base layer may include basic content of the picture, and the enhancement layer may be used to ensure higher picture quality.

Because a wireless transmission channel is prone to be affected by a plurality of factors such as a use environment or a noise interference signal, a channel transmission bandwidth is unstable. As a result, a base layer or an enhancement layer of a sub-picture is prone to be lost when a channel bandwidth is low or channel interruption occurs, causing a picture quality problem. For example, when a base layer of a sub-picture is lost due to a low channel bandwidth or channel interruption, the sub-picture whose base layer is lost cannot be displayed.

In a conventional technology, when a sub-picture of a frame of picture is lost, a picture received before the frame of picture and a sub-picture in a position corresponding to the sub-picture are used for padding. To be specific, as shown in FIG. 1, a displayed picture includes content of a plurality of sub-pictures originally belonging to a plurality of frames of pictures. A picture tearing problem occurs at a junction of sub-pictures from different frames of pictures (e.g., a junction of a sub-picture (0) of a picture (n−1) and a sub-picture (1) of a picture (n)). Consequently, video watching experience of a user is affected.

SUMMARY

Embodiments of the present disclosure provide a picture processing method and apparatus to avoid picture tearing as much as possible and improve picture quality of an entire video stream and video watching experience of a user.

To achieve the foregoing objectives, the following technical solutions are used in embodiments of this application.

According to a first aspect, an embodiment of the present disclosure provides a picture processing method, which may be applied to a decoder side. The method includes: when receiving a first picture in a video stream, the decoder side determines, based on a base layer of the 1st sub-picture of the first picture, whether the first picture meets a first preset condition; and the decoder side sends a second picture within a display time period of the first picture for displaying if the first picture meets the first preset condition, where the second picture is a picture that is in the video stream and that is sent within a first display time period for displaying, the first display time period is a picture display time period before the display time period of the first picture, each frame of picture in the video stream includes a plurality of sub-pictures, and each of the sub-pictures includes a base layer.

In this solution, the decoder side may determine, depending on whether the first picture meets the first preset condition, whether a picture tearing problem is to occur in the first picture. When the picture tearing problem is to occur in the first picture, the decoder side sends the second picture within the display time period of the first picture for displaying, so that a display side displays the second picture within the display time period of the first picture instead of displaying the first picture in which the picture tearing problem is to occur. This can avoid the picture tearing problem of the first picture as much as possible and improve picture quality of the entire video stream and video watching experience of a user.

In a possible design, the first preset condition includes: the base layer of the 1st sub-picture of the first picture is lost or partially lost.

To be specific, if the decoder side does not receive the base layer of the 1st sub-picture of the complete first picture, the decoder side may determine that the first preset condition is met, and therefore determine that the picture tearing problem is to occur in the first picture.

In another possible design, the decoder side stores the received 1st sub-picture of the first picture into a buffer.

In this way, the decoder side may decode another received subsequent picture by using the received 1st sub-picture of the first picture as a reference.

In another possible design, the method further includes: when scene switching occurs, the decoder side determines, based on the base layer of the 1st sub-picture of the first picture, whether the first picture meets a second preset condition; and the decoder side sends the second picture within the display time period of the first picture for displaying if the first picture meets the second preset condition.

Content of two adjacent frames of pictures differs greatly before and after scene switching. An amount of data at a base layer of a picture after scene switching may increase compared with that of a picture before scene switching. Therefore, a possibility of loss of the base layer is higher, and a probability of picture tearing is also higher.

In this solution, during scene switching, the decoder side may determine, depending on whether the first picture meets the second preset condition, whether a picture tearing problem is to occur in the first picture. When the picture tearing problem is to occur in the first picture, the decoder side sends the second picture within the display time period of the first picture for displaying, so that the display side displays the second picture within the display time period of the first picture instead of displaying the first picture in which the picture tearing problem is to occur. This can avoid the picture tearing problem of the first picture as much as possible and improve picture quality of the entire video stream and video watching experience of the user.

In another possible design, the second preset condition includes: a ratio of an amount of encoded data at the base layer that is of the 1st sub-picture of the first picture and that is received within first preset duration to a first channel bandwidth is greater than or equal to a first preset value, and a ratio of the amount of the encoded data at the base layer that is of the 1st sub-picture of the first picture and that is received within the first preset duration to a second channel bandwidth is greater than or equal to a second preset value. The first channel bandwidth is an average bandwidth within the first preset duration, the second channel bandwidth is an average bandwidth within second preset duration, the second preset duration is greater than the first preset duration, and the second preset duration is obtained by extending the first preset duration forward or backward along a time axis.

It should be understood that the first preset duration is usually very short, for example, may be 4 milliseconds (ms), the average bandwidth within the first preset duration may be understood as an instantaneous bandwidth, and the second preset duration may be understood as an average bandwidth within a time period. To be specific, the decoder side may predict, based on a current receiving bit rate, the instantaneous bandwidth, and the average bandwidth, whether picture tearing is to occur in the first picture.

In another possible design, each of the sub-pictures further includes at least one enhancement layer. The method further includes: when scene switching occurs, determining, based on an enhancement layer of the 1st sub-picture of the first picture, whether the first picture meets a third preset condition; and if the first picture meets the third preset condition, entering, by the decoder side, a target mode, sending the second picture in the target mode for displaying, and storing received sub-pictures of the first picture into a buffer.

Content of two adjacent frames of pictures differs greatly before and after scene switching. An amount of data at an enhancement layer of a picture after scene switching may increase compared with that of a picture before scene switching. Therefore, a possibility of loss (including complete loss or partial loss) of the enhancement layer is higher, and a probability of picture blurring is also higher.

In this solution, the target mode may be understood as an anti-blurring mode. During scene switching, the decoder side may determine, depending on whether the first picture meets the third preset condition, whether a picture blurring problem is to occur in the first picture. When the picture blurring problem is to occur in the first picture, the decoder side may enable the anti-blurring mode, to continuously send the second picture in the anti-blurring mode for displaying. In this case, the second picture is displayed instead of the current first picture that is to be blurred. This can avoid picture blurring of a current frame of picture as much as possible and improve picture quality of the entire video stream and video watching experience of the user.

In addition, the decoder side stores the received sub-pictures of the first picture into the buffer, so as to decode, by using the sub-pictures of the first picture as a reference, another received subsequent picture that uses the first picture as an inter-coding reference frame.

In another possible design, the third preset condition includes: a quantity of enhancement layers that are of the 1st sub-picture of the first picture and that are received by the decoder side is less than or equal to a third preset value; or a ratio of an amount of encoded data at an enhancement layer that is of the 1st sub-picture of the first picture and that is received within third preset duration to a third channel bandwidth is greater than or equal to a fourth preset value, and a ratio of the amount of the encoded data at the enhancement layer that is of the 1st sub-picture of the first picture and that is received within the third preset duration to a fourth channel bandwidth is greater than or equal to a fifth preset value. The third channel bandwidth is an average bandwidth within the third preset duration, the fourth channel bandwidth is an average bandwidth within fourth preset duration, the fourth preset duration is greater than the third preset duration, and the fourth preset duration is obtained by extending the third preset duration forward or backward along a time axis.

It should be understood that the average bandwidth within the third preset duration may be understood as an instantaneous bandwidth, and the fourth preset duration may be understood as an average bandwidth within a time period. To be specific, the decoder side may determine, based on the quantity of received enhancement layers of the 1st sub-picture of the first picture, whether the third preset condition is met. Alternatively, the decoder side may determine, based on a current receiving bit rate, the instantaneous bandwidth, and the average bandwidth, whether the third preset condition is met.

In another possible design, when the decoder side enters the target mode, the method further includes: the decoder side sends first indication information to an encoder side, to indicate the encoder side to enter the target mode.

To be specific, after entering the anti-blurring mode, the decoder side may indicate the encoder side to enter the anti-blurring mode, so as to perform a corresponding processing operation in the anti-blurring mode.

In another possible design, the method further includes: the decoder side exits the target mode when a quantity of received enhancement layers of each sub-picture of the first picture is greater than or equal to a sixth preset value, to send a latest successfully decoded picture for displaying; and the decoder side sends second indication information to the encoder side, to indicate the encoder side to exit the target mode.

In this solution, if determining that the quantity of enhancement layers of each sub-picture of the first picture is greater than or equal to the sixth preset value, the decoder side may determine that the first picture of good quality has been received, and therefore may exit the anti-blurring mode and indicate the encoder side to exit the anti-blurring mode based on the second indication information, so that the encoder side stops sending the first picture.

According to a second aspect, an embodiment of the present disclosure provides a picture processing method, which may be applied to an encoder side. The method includes: in a process of sending a first picture in a video stream to a decoder side, the encoder side enters a target mode after receiving first indication information from the decoder side, and adjusts a coding parameter in the target mode, to reduce an amount of encoded data of another sub-picture following the 1st sub-picture of the first picture; the encoder side sets, to the first picture, an inter-coding reference frame of a picture following the first picture; and the encoder side exits the target mode after second indication information is received from the decoder side, to stop sending the first picture to the decoder side and send a latest successfully encoded picture in the video stream to the decoder side.

In this solution, after receiving indication information that indicates to enter an anti-blurring mode and that is from the decoder side, the encoder side continuously sends the first picture in the anti-blurring mode, and adjusts a coding parameter to reduce an amount of encoded data of another sub-picture following the 1st sub-picture of the first picture; or a coding compression rate for a subsequent to-be-transmitted picture is increased, to successfully send the encoded data of the another sub-picture following the 1st sub-picture of the first picture to the decoder side in the case of a current channel. In addition, in the anti-blurring mode, the encoder side sets, to the first picture, each of inter-coding reference frames of pictures following the first picture, to inter-code another frame of picture following the first picture in the anti-blurring mode by using the first picture as a reference and provide a good coding reference for inter-coding a subsequent picture frame of the first picture after scene switching. In this case, an amount of encoded data of the subsequent picture frame decreases, so that the encoded data of the subsequent picture frame can be successfully transmitted even in the case of a low current channel bandwidth. This improves long-term picture blurring and picture display effect.

According to a third aspect, an embodiment of the present disclosure provides a picture processing method, which may be applied to an encoder side. The method includes: when scene switching occurs, the encoder side determines, based on a base layer of the 1st sub-picture of a first picture in a video stream, whether the first picture meets a fourth preset condition; and if the first picture meets the fourth preset condition, the encoder side sends third indication information to a decoder side, to indicate the decoder side to send a second picture within a display time period of the first picture for displaying. The second picture is a picture that is in the video stream and that is sent within a first display time period for displaying, the first display time period is a picture display time period before the display time period of the first picture, each frame of picture in the video stream includes a plurality of sub-pictures, and each of the sub-pictures includes a base layer.

In this solution, during scene switching, the encoder side may determine, depending on whether the first picture meets the fourth preset condition, whether a picture tearing problem is to occur in the first picture. When the picture tearing problem is to occur in the first picture, the encoder side notifies a decoder side in a timely manner, so that the decoder side sends the second picture within the display time period of the first picture for displaying. In this case, a display side displays the second picture within the display time period of the first picture instead of the first picture in which the picture tearing problem is to occur. This can avoid the picture tearing problem of the first picture as much as possible and improve picture quality of the entire video stream and video watching experience of a user.

In a possible design, the fourth preset condition includes: a ratio of an amount of encoded data at the base layer that is of the 1st sub-picture of the first picture and that is successfully sent by the encoder side within fifth preset duration to a fifth channel bandwidth is greater than a seventh preset value, and a ratio of the amount of the encoded data at the base layer that is of the 1st sub-picture of the first picture and that is successfully sent within the fifth preset duration to a sixth channel bandwidth is greater than an eighth preset value. The fifth channel bandwidth is an average bandwidth within the fifth preset duration, the sixth channel bandwidth is an average bandwidth within sixth preset duration, the sixth preset duration is greater than the fifth preset duration, and the sixth preset duration is obtained by extending the fifth preset duration forward or backward along a time axis.

It should be understood that the average bandwidth within the fifth preset duration may be understood as an instantaneous bandwidth, and the sixth preset duration may be understood as an average bandwidth within a time period. To be specific, the encoder side may predict, based on a current sending bit rate, the instantaneous bandwidth, and the average bandwidth, whether picture tearing is to occur in the first picture.

In another possible design, each of the sub-pictures further includes at least one enhancement layer. The method further includes: when scene switching occurs, the encoder side determines, based on an enhancement layer of the 1st sub-picture of the first picture, whether the first picture meets a fifth preset condition; the encoder side enters a target mode if the first picture meets the fifth preset condition, and sends fourth indication information to the decoder side in the target mode, to indicate the decoder side to enter the target mode; the encoder side adjusts a coding parameter in the target mode, to reduce an amount of encoded data of another sub-picture following the 1st sub-picture in the first picture; and the encoder side sets, to the first picture, an inter-coding reference frame of a picture following the first picture.

During scene switching, the encoder side may determine, depending on whether the first picture meets the fifth preset condition, whether a picture blurring problem is to occur in the first picture. When the picture blurring problem is to occur in the first picture, the encoder side may indicate the decoder side to enter an anti-blurring mode, and the encoder side also enables an anti-blurring mode. The encoder side continuously sends the first picture in the anti-blurring mode, and adjusts a coding parameter to reduce an amount of encoded data of another sub-picture following the 1st sub-picture of the first picture or increase a coding compression rate of a subsequent to-be-transmitted picture. In this case, an amount of encoded data of the to-be-transmitted picture is reduced, so that the encoded data of the another sub-picture following the 1st sub-picture of the first picture can be successfully sent to the decoder side in the case of a current channel.

In addition, in the anti-blurring mode, the encoder side sets, to the first picture, each of inter-coding reference frames of pictures following the first picture, to inter-code another frame of picture following the first picture in the anti-blurring mode by using the first picture as a reference and provide a good coding reference for inter-coding a subsequent picture frame of the first picture after scene switching. In this case, an amount of encoded data of the subsequent picture frame decreases, so that the encoded data of the subsequent picture frame can be successfully transmitted even in the case of a low current channel bandwidth. This improves long-term picture blurring and picture display effect.

In another possible design, the fifth preset condition includes: a quantity of enhancement layers that are of the 1st sub-picture of the first picture and that are successfully sent by the encoder side is less than or equal to a ninth preset value; or a ratio of an amount of encoded data at an enhancement layer that is of the 1st sub-picture of the first picture and that is successfully sent by the encoder side within seventh preset duration to a seventh channel bandwidth is greater than or equal to a tenth preset value, and a ratio of the amount of the encoded data at the enhancement layer that is of the 1st sub-picture of the first picture and that is successfully sent within the seventh preset duration to an eighth channel bandwidth is greater than or equal to an eleventh preset value. The seventh channel bandwidth is an average bandwidth within the seventh preset duration, the eighth channel bandwidth is an average bandwidth within eighth preset duration, the eighth preset duration is greater than the seventh preset duration, and the eighth preset duration is obtained by extending the seventh preset duration forward or backward along a time axis.

It should be understood that the average bandwidth within the seventh preset duration may be understood as an instantaneous bandwidth, and the eighth preset duration may be understood as an average bandwidth within a time period. To be specific, the encoder side may determine, based on the quantity of successfully sent enhancement layers of the 1st sub-picture of the first picture, whether the fifth preset condition is met. Alternatively, the encoder side may determine, based on a current sending bit rate, the instantaneous bandwidth, and the average bandwidth, whether the fifth preset condition is met.

In another possible design, the method further includes: the encoder side exits the target mode when a quantity of successfully sent enhancement layers of each sub-picture of the first picture is greater than or equal to a twelfth preset value, to stop sending the first picture to the decoder side and send a latest successfully encoded picture in the video stream to the decoder side; and the encoder side sends fifth indication information to the decoder side, to indicate the decoder side to exit the target mode.

In this solution, when the quantity of successfully sent enhancement layers of each sub-picture of the first picture is greater than or equal to the twelfth preset value, the encoder side determines that the decoder side has successfully received the first picture of good quality, and therefore may exit the anti-blurring mode and indicate the decoder side to exit the anti-blurring mode.

According to a fourth aspect, an embodiment of the present disclosure provides a picture processing method, which may be applied to a decoder side. The method includes: in a process of receiving a first picture in a video stream from an encoder side, the decoder side sends a second picture within a display time period of the first picture for displaying if receiving third indication information from the encoder side. The second picture is a picture that is in the video stream and that is sent within a first display time period for displaying, and the first display time period is a picture display time period before the display time period of the first picture.

In this solution, if receiving related indication information from the encoder side, the decoder side sends the second picture within the display time period of the first picture for displaying, so that a display side displays the second picture within the display time period of the first picture instead of the first picture.

In a possible design, the method further includes: entering a target mode if the decoder side receives fourth indication information from the encoder side, sending the second picture in the target mode for displaying, and storing received sub-pictures of the first picture into a buffer; and exiting, by the decoder side, the target mode after fifth indication information is received from the encoder side, to send a latest successfully decoded picture for displaying.

In this solution, the target mode may be understood as an anti-blurring mode. After receiving the related indication information from the encoder side, the decoder side may enter the anti-blurring mode, so as to send the second picture for displaying. In this case, the display side displays the second picture instead of the first picture. In addition, the decoder side may further store the received sub-pictures of the first picture into the buffer, so as to provide a decoding reference for a subsequent picture.

In another possible design, that scene switching occurs includes: a ratio of an area of an intra coding block of the 1st sub-picture of the first picture to a total area of the 1st sub-picture of the first picture is greater than or equal to a thirteenth preset value, and/or a ratio of an amount of encoded data of the 1st sub-picture of the first picture to an amount of encoded data of a reference sub-picture of a third picture is greater than or equal to a fourteenth preset value. The third picture is a previous frame of picture of the first picture in the video stream, and the reference sub-picture is a sub-picture whose position corresponds to that of the 1st sub-picture of the first picture and that is of the third picture.

In other words, a factor, for example, the area of the intra coding block of the 1st sub-picture or the amount of the encoded data of the 1st sub-picture may be used to determine whether scene switching occurs.

According to a fifth aspect, an embodiment of the present disclosure provides a picture processing apparatus, including a transceiver module and a processing module. The processing module is configured to: when a first picture in a video stream is received by using the transceiver module, determine, based on a base layer of the 1st sub-picture of the first picture, whether the first picture meets a first preset condition. The processing module is further configured to send a second picture within a display time period of the first picture for displaying by using the transceiver module if the first picture meets the first preset condition. The second picture is a picture that is in the video stream and that is sent within a first display time period for displaying, the first display time period is a picture display time period before the display time period of the first picture, each frame of picture in the video stream includes a plurality of sub-pictures, and each of the sub-pictures includes a base layer.

In this solution, the picture processing apparatus may determine, depending on whether the first picture meets the first preset condition, whether a picture tearing problem is to occur in the first picture. When the picture tearing problem is to occur in the first picture, the picture processing apparatus sends the second picture within the display time period of the first picture for displaying, so that a display side displays the second picture within the display time period of the first picture instead of the first picture in which the picture tearing problem is to occur. This can avoid the picture tearing problem of the first picture as much as possible and improve picture quality of the entire video stream and video watching experience of a user. For example, the picture processing apparatus is a decoder side.

In a possible design, the first preset condition includes: the base layer of the 1st sub-picture of the first picture is lost or partially lost.

In another possible design, the processing module is further configured to: when scene switching occurs, determine, based on the base layer of the 1st sub-picture of the first picture, whether the first picture meets a second preset condition. The processing module is further configured to send the second picture within the display time period of the first picture for displaying by using the transceiver module if the first picture meets the second preset condition.

In another possible design, the second preset condition includes: a ratio of an amount of encoded data at the base layer that is of the 1st sub-picture of the first picture and that is received within first preset duration to a first channel bandwidth is greater than or equal to a first preset value, and a ratio of the amount of the encoded data at the base layer that is of the 1st sub-picture of the first picture and that is received within the first preset duration to a second channel bandwidth is greater than or equal to a second preset value. The first channel bandwidth is an average bandwidth within the first preset duration, the second channel bandwidth is an average bandwidth within second preset duration, the second preset duration is greater than the first preset duration, and the second preset duration is obtained by extending the first preset duration forward or backward along a time axis.

In another possible design, each of the sub-pictures further includes at least one enhancement layer. The processing module is further configured to: when scene switching occurs, determine, based on an enhancement layer of the 1st sub-picture of the first picture, whether the first picture meets a third preset condition. The processing module is further configured to: if the first picture meets the third preset condition, enter a target mode; send the second picture in the target mode for displaying by using the transceiver module; and store, into a buffer, sub-pictures that are of the first picture and that are received by using the transceiver module.

In another possible design, the third preset condition includes: a quantity of received enhancement layers of the 1st sub-picture of the first picture is less than or equal to a third preset value; or a ratio of an amount of encoded data at an enhancement layer that is of the 1st sub-picture of the first picture and that is received within third preset duration to a third channel bandwidth is greater than or equal to a fourth preset value, and a ratio of the amount of the encoded data at the enhancement layer that is of the 1st sub-picture of the first picture and that is received within the third preset duration to a fourth channel bandwidth is greater than or equal to a fifth preset value. The third channel bandwidth is an average bandwidth within the third preset duration, the fourth channel bandwidth is an average bandwidth within fourth preset duration, the fourth preset duration is greater than the third preset duration, and the fourth preset duration is obtained by extending the third preset duration forward or backward along a time axis.

In another possible design, when the target mode is entered, the processing module is further configured to send first indication information to an encoder side by using the transceiver module, to indicate the encoder side to enter the target mode.

In another possible design, the processing module is further configured to exit the target mode when a quantity of enhancement layers that are of each of the sub-pictures of the first picture and that are received by using the transceiver module is greater than or equal to a sixth preset value, to send a latest successfully decoded picture for displaying by using the transceiver module. The processing module is further configured to send second indication information to the encoder side by using the transceiver module, to indicate the encoder side to exit the target mode.

According to a sixth aspect, an embodiment of the present disclosure provides a picture processing apparatus, including a transceiver module and a processing module. The processing module is configured to: in a process of sending a first picture in a video stream to a decoder side by using the transceiver module, enter a target mode after first indication information is received from the decoder side by using the transceiver module; and adjust a coding parameter in the target mode, to reduce an amount of encoded data of another sub-picture following the 1st sub-picture of the first picture. The processing module is further configured to set, to the first picture, an inter-coding reference frame of a picture following the first picture. The processing module is further configured to exit the target mode after second indication information is received from the decoder side by using the transceiver module, to stop sending the first picture to the decoder side by using the transceiver module and send a latest successfully encoded picture in the video stream to the decoder side by using the transceiver module.

In this solution, after receiving indication information that indicates to enter an anti-blurring mode and that is from the decoder side, the picture processing apparatus continuously sends the first picture in the anti-blurring mode, and adjusts a coding parameter to reduce an amount of encoded data of another sub-picture following the 1st sub-picture of the first picture, to successfully send the encoded data of the another sub-picture following the 1st sub-picture of the first picture to the decoder side in the case of a current channel. In addition, in the anti-blurring mode, the picture processing apparatus sets, to the first picture, each of inter-coding reference frames of pictures following the first picture, to inter-code another frame of picture following the first picture in the anti-blurring mode by using the first picture as a reference and provide a good coding reference for inter-coding a subsequent picture frame of the first picture after scene switching. In this case, an amount of encoded data of the subsequent picture frame decreases, so that the encoded data of the subsequent picture frame can be successfully transmitted even in the case of a low current channel bandwidth. This improves long-term picture blurring and picture display effect. For example, the picture processing apparatus is an encoder side.

According to a seventh aspect, an embodiment of the present disclosure provides a picture processing apparatus, including a transceiver module and a processing module. The processing module is configured to: when scene switching occurs, determine, based on a base layer of the 1st sub-picture of a first picture in a video stream, whether the first picture meets a fourth preset condition. The processing module is further configured to: if the first picture meets the fourth preset condition, send third indication information to a decoder side by using the transceiver module, to indicate the decoder side to send a second picture within a display time period of the first picture for displaying. The second picture is a picture that is in the video stream and that is sent within a first display time period for displaying, the first display time period is a picture display time period before the display time period of the first picture, each frame of picture in the video stream includes a plurality of sub-pictures, and each of the sub-pictures includes a base layer.

In this solution, during scene switching, the picture processing apparatus may determine, depending on whether the first picture meets the fourth preset condition, whether a picture tearing problem is to occur in the first picture. When the picture tearing problem is to occur in the first picture, the picture processing apparatus notifies the decoder side in a timely manner, so that the decoder side sends the second picture within the display time period of the first picture for displaying. In this case, a display side displays the second picture within the display time period of the first picture instead of the first picture in which the picture tearing problem is to occur. This can avoid the picture tearing problem of the first picture as much as possible and improve picture quality of the entire video stream and video watching experience of a user. For example, the picture processing apparatus is an encoder side.

In a possible design, the fourth preset condition includes: a ratio of an amount of encoded data at the base layer that is of the 1st sub-picture of the first picture and that is successfully sent within fifth preset duration to a fifth channel bandwidth is greater than a seventh preset value, and a ratio of the amount of the encoded data at the base layer that is of the 1st sub-picture of the first picture and that is successfully sent within the fifth preset duration to a sixth channel bandwidth is greater than an eighth preset value. The fifth channel bandwidth is an average bandwidth within the fifth preset duration, the sixth channel bandwidth is an average bandwidth within sixth preset duration, the sixth preset duration is greater than the fifth preset duration, and the sixth preset duration is obtained by extending the fifth preset duration forward or backward along a time axis.

In another possible design, each of the sub-pictures further includes at least one enhancement layer. The processing module is further configured to: when scene switching occurs, determine, based on an enhancement layer of the 1st sub-picture of the first picture, whether the first picture meets a fifth preset condition. The processing module is further configured to: enter a target mode if the first picture meets the fifth preset condition, and send fourth indication information to the decoder side in the target mode by using the transceiver module, to indicate the decoder side to enter the target mode. The processing module is further configured to adjust a coding parameter in the target mode, to reduce an amount of encoded data of another sub-picture following the 1st sub-picture in the first picture. The processing module is further configured to set, to the first picture, an inter-coding reference frame of a picture following the first picture.

In another possible design, the fifth preset condition includes: a quantity of successfully sent enhancement layers of the 1st sub-picture of the first picture is less than or equal to a ninth preset value; or a ratio of an amount of encoded data at an enhancement layer that is of the 1st sub-picture of the first picture and that is successfully sent within seventh preset duration to a seventh channel bandwidth is greater than or equal to a tenth preset value, and a ratio of the amount of the encoded data at the enhancement layer that is of the 1st sub-picture of the first picture and that is successfully sent within the seventh preset duration to an eighth channel bandwidth is greater than or equal to an eleventh preset value. The seventh channel bandwidth is an average bandwidth within the seventh preset duration, the eighth channel bandwidth is an average bandwidth within eighth preset duration, the eighth preset duration is greater than the seventh preset duration, and the eighth preset duration is obtained by extending the seventh preset duration forward or backward along a time axis.

In another possible design, the processing module is further configured to exit the target mode when a quantity of enhancement layers that are of each sub-picture of the first picture and that are successfully sent by using the transceiver module is greater than or equal to a twelfth preset value, to stop sending the first picture to the decoder side by using the transceiver module and send a latest successfully encoded picture in the video stream to the decoder side by using the transceiver module. The processing module is further configured to send fifth indication information to the decoder side by using the transceiver module, to indicate the decoder side to exit the target mode.

According to an eighth aspect, an embodiment of the present disclosure provides a picture processing apparatus, including a processing module and a transceiver module. The processing module is configured to: in a process of receiving a first picture in a video stream from an encoder side by using the transceiver module, send a second picture within a display time period of the first picture for displaying by using the transceiver module if third indication information is received from the encoder side by using the transceiver module. The second picture is a picture that is in the video stream and that is sent within a first display time period for displaying, and the first display time period is a picture display time period before the display time period of the first picture.

In this solution, if receiving related indication information from the encoder side, the picture processing apparatus sends the second picture within the display time period of the first picture for displaying, so that a display side displays the second picture within the display time period of the first picture instead of the first picture. For example, the picture processing apparatus is a decoder side.

In a possible design, the processing module is further configured to: enter a target mode if fourth indication information is received from the encoder side by using the transceiver module, send the second picture in the target mode for displaying by using the transceiver module, and store, into a buffer, sub-pictures that are of the first picture and that are received by using the transceiver module. The processing module is further configured to exit the target mode after fifth indication information is received from the encoder side by using the transceiver module, to send a latest successfully decoded picture for displaying by using the transceiver module.

According to a ninth aspect, an embodiment of the present disclosure provides a picture processing apparatus. The picture processing apparatus may be an encoder side, or may be located on an encoder side. Alternatively, the picture processing apparatus may be a decoder side, or may be located on a decoder side. The picture processing apparatus includes a processor and a transmission interface. The transmission interface is coupled to the processor. The transmission interface is used to receive or send a picture in a video stream. The processor is configured to invoke software instructions in the memory, to perform the picture processing method performed by the picture processing apparatus in any one of the first to the fourth aspects or the possible designs of the first to the fourth aspects.

According to a tenth aspect, an embodiment of the present disclosure provides a picture processing apparatus, including one or more processors and a memory. The memory stores code. When the code is executed by the picture processing apparatus, the picture processing apparatus is enabled to perform the picture processing method performed by the picture processing apparatus in any one of the first to the fourth aspects or the possible designs of the first to the fourth aspects.

According to an eleventh aspect, an embodiment of the present disclosure provides a computer-readable storage medium, including computer instructions. When the computer instructions are run on a picture processing apparatus, the picture processing apparatus is enabled to perform the picture processing method in any one of the first to the fourth aspects or the possible designs of the first to the fourth aspects.

According to a twelfth aspect, an embodiment of the present disclosure provides a computer program product. When the computer program product runs on a computer, the computer is enabled to perform the picture processing method performed by the picture processing apparatus in any one of the first to the fourth aspects or the possible designs of the first to the fourth aspects.

According to a thirteenth aspect, an embodiment of the present disclosure provides a chip system. The chip system is applied to a picture processing apparatus. The chip system includes one or more interface circuits and one or more processors. The interface circuit and the processor are interconnected through a line. The interface circuit is configured to receive a signal from a memory of the picture processing apparatus, and send the signal to the processor. The signal includes computer instructions stored in the memory. When the processor executes the computer instructions, the picture processing apparatus is enabled to perform the picture processing method in any one of the first to the fourth aspects or the possible designs of the first to the fourth aspects.

According to a fourteenth aspect, an embodiment of the present disclosure provides a picture processing system, including an encoder side and a decoder side. The encoder side and the decoder side may be configured to perform the picture processing method in any one of the first to the fourth aspects or the possible designs of the first to the fourth aspects.

For beneficial effects corresponding to the other aspects, refer to descriptions of beneficial effects in the method aspects.

DESCRIPTION OF EMBODIMENTS

For ease of understanding, the following uses examples to describe some concepts related to embodiments of the present disclosure for reference. Details are as follows:

Video stream: a plurality of frames of consecutive video pictures.

Sub-picture: a plurality of small picture blocks obtained by dividing a complete frame of picture. For example, a 1920*1080-pixel picture may be divided into three 1920*360-pixel sub-pictures. During sub-frame-level picture processing, a frame of picture may be divided into a plurality of sub-pictures.

Base layer and enhancement layer of a picture: each sub-picture may be divided into a plurality of layers including one base layer and at least one enhancement layer. The base layer may include basic content of the picture, and the enhancement layer is used to ensure higher picture quality.

Picture tearing: a picture tearing phenomenon occurs at a junction of sub-pictures from different frames of pictures when a displayed picture includes content of a plurality of sub-pictures originally belonging to a plurality of frames of pictures.

Picture blurring: when a displayed picture does not include an enhancement layer or includes a small quantity of enhancement layers, low picture quality is caused, and consequently a picture blurring phenomenon occurs.

The following describes the technical solutions in embodiments of the present disclosure with reference to the accompanying drawings in embodiments of this application. In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions in embodiments, unless otherwise specified, "a plurality of" means two or more.

Figure 1:
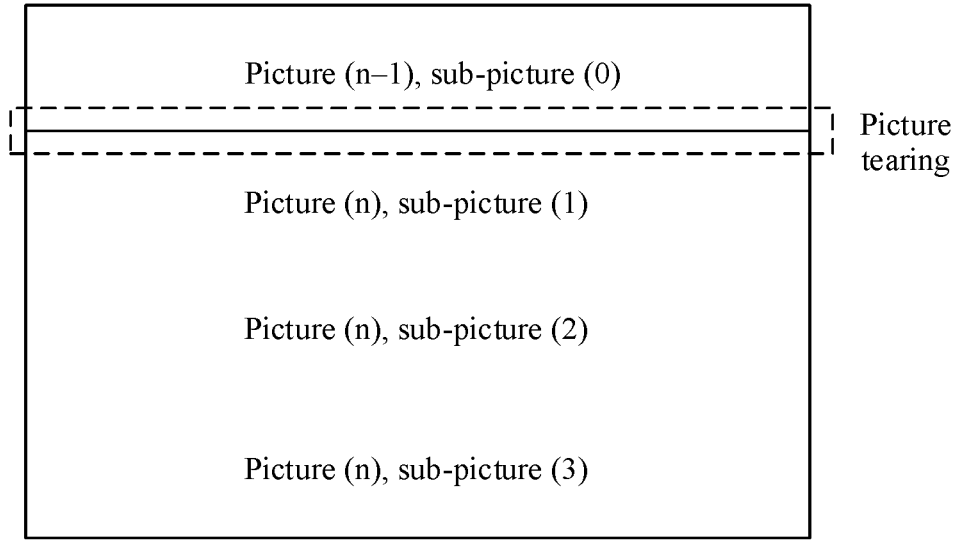
FIG. 1 is a schematic diagram of a picture tearing case according to an embodiment of this application.
Figure 2:
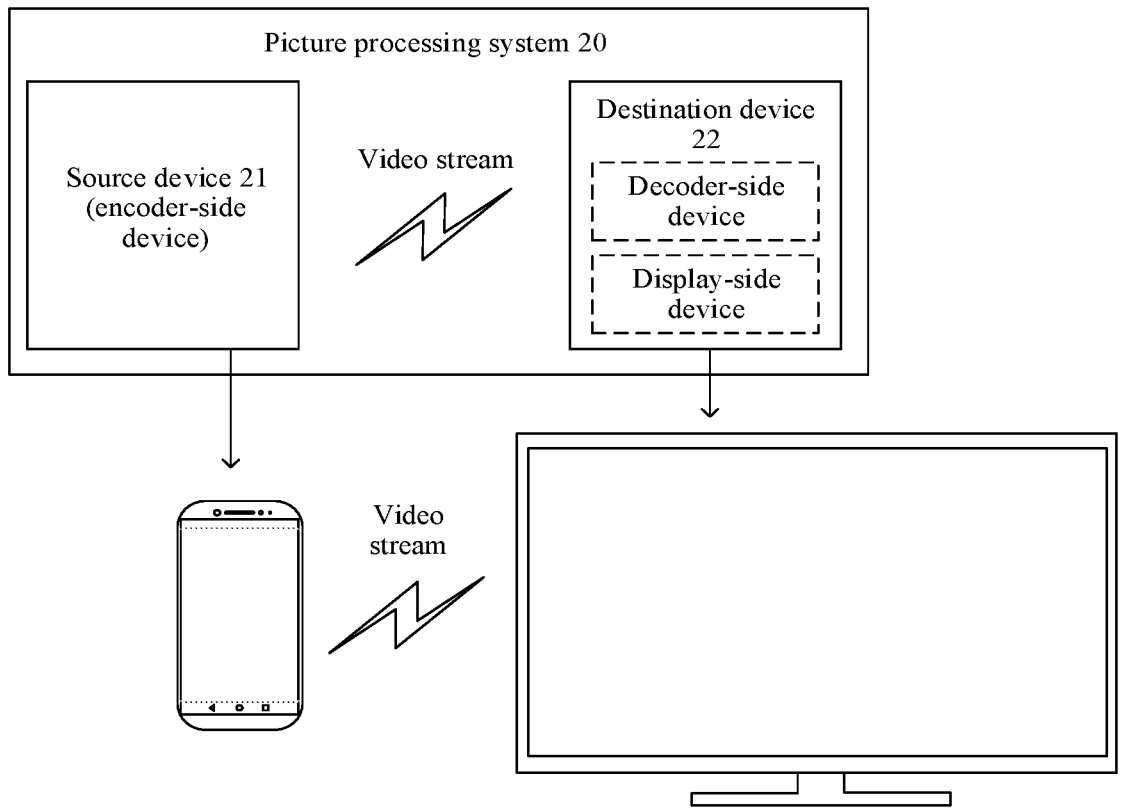
FIG. 2 is a schematic diagram of a picture processing system according to an embodiment of the present disclosure.

An embodiment of the present disclosure provides a picture processing method, which may be applied to a picture processing system 20 shown in FIG. 2. Refer to FIG. 2. The picture processing system 20 may include a source device 21, a destination device 22, and the like. The source device may send encoded picture frames to the destination device in a wireless transmission mode after encoding consecutive picture frames. The destination device is configured to decode and display the received picture frames. The consecutive picture frames herein may also be referred to as a picture sequence, for example, may be a sequence of pictures in a video stream or a sequence of a plurality of frames of associated pictures (e.g., a plurality of photos captured in continuous shooting mode).

For example, the picture processing method provided in this embodiment of the present disclosure may be applied to a plurality of wireless short-range screen projection application scenarios, such as game projection, video projection (e.g., recorded video projection), or associated multi-frame picture sequence projection (e.g., PPT projection during office use). Consecutive game video pictures exchanged between an encoder side and a decoder side in the game projection scenario may also be referred to as a video stream. Descriptions are provided in the following embodiments of the present disclosure by using an example in which the encoder side sends a video stream to the decoder side.

For example, the wireless transmission mode may include a wireless local area network (WLAN) (e.g., a wireless fidelity (Wi-Fi) network), Bluetooth (BT), a global navigation satellite system (GNSS), frequency modulation (FM), near field communication (NFC), or infrared (IR) communication.

For example, the source device may be an electronic device with strong processing capabilities such as graphics rendering and encoding, for example, a mobile phone, a wearable device (e.g., a watch or a band), a tablet computer, an in-vehicle device, a notebook computer, an ultra-mobile personal computer (UMPC), a netbook, or a personal digital assistant (PDA). Alternatively, the source device may be a device that has high user interactivity and is easy to operate, for example, a mobile phone or a tablet computer. The destination device may be an electronic device with good display effect, for example, a television, a large-screen device, or an augmented reality (AR)/virtual reality (VR) device.

The source device has, for example, picture obtaining, encoding, and sending functions, and may also be referred to as an encoder-side device. Picture obtaining includes obtaining a downloaded video picture, a recorded video picture, or a video picture generated via an application, obtaining a video picture in another manner, or the like. For a video picture (e.g., a game video picture) generated via an application or another picture, the source device further has a function such as graphics rendering. The destination device has picture receiving, decoding, and displaying functions. In some embodiments, the destination device is a physical device, and includes an interface module and a display module. In some other embodiments, the destination device may include two independent physical devices, that is, a decoder-side device and a display-side device. The decoder-side device is configured to process, for example, receive and decode, a picture. The display-side device is configured to display a picture, and may be further configured to perform related processing such as picture enhancement on a to-be-displayed picture.

In some embodiments, the decoder-side device and the display-side device may be integrated into one physical device, and the encoder-side device is another independent physical device. In some other embodiments, the encoder-side device, the decoder-side device, and the display-side device are different physical devices. In some other embodiments, the encoder-side device and the decoder-side device are located on one physical device, and the display-side device is another independent physical device.

Figure 3A:
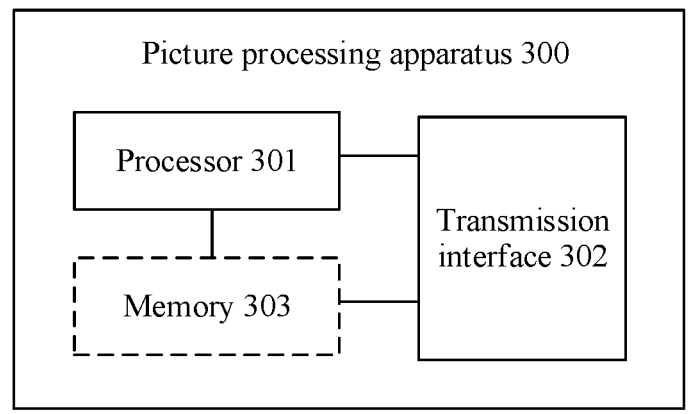
FIG. 3A is schematic diagram 1 of a hardware structure of a picture processing apparatus according to an embodiment of the present disclosure.

The encoder-side device, the decoder-side device, and the display-side device may be referred to as a picture processing apparatus or a picture processing device. For example, FIG. 3A provides a schematic diagram of a hardware structure of a picture processing apparatus 300. The picture processing apparatus 300 may include a processor 301 and a transmission interface 302. The transmission interface 302 is coupled to the processor 301. This transmission interface is used to receive or transmit a picture in a video stream. The processor is configured to invoke software instructions in a memory, to perform the picture processing method provided in embodiments of this application.

The processor may be a general-purpose central processing unit (CPU), a microprocessor, an application-specific integrated circuit (ASIC), or one or more integrated circuits configured to control execution of a program in the solutions of this application.

The communication interface is applicable to any apparatus such as a transceiver, and is configured to communicate with another device or a communication network, for example, a radio access network (RAN) or a wireless local area network (WLAN).

In some embodiments, the picture processing apparatus 300 may further include the memory 303 configured to store the software instructions. The memory may be a read-only memory (ROM) or another type of static storage device capable of storing static information and instructions, or a random-access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, or the like), a magnetic disk storage medium or another magnetic storage communication device, or any other medium capable of carrying or storing expected program code in a form of an instruction or a data structure and accessible by a computer. However, this is not limited thereto. The memory may exist independently, or may be integrated with the processor.

Figure 3B:
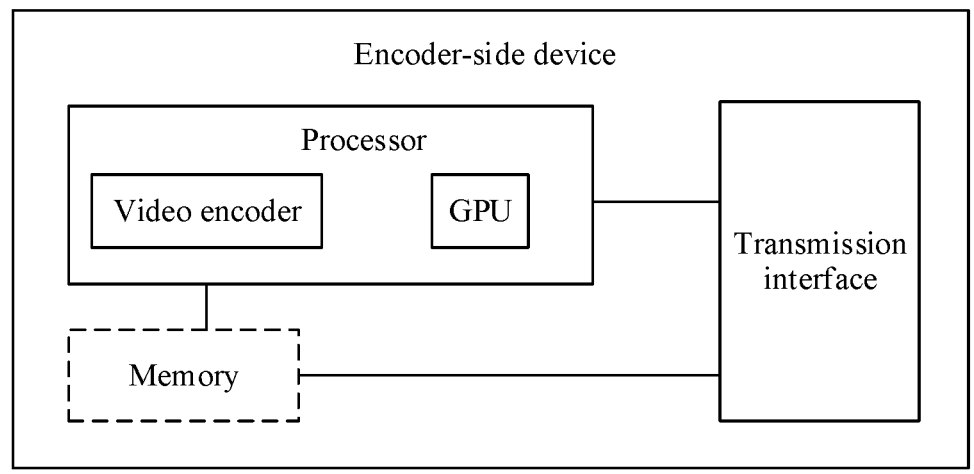
FIG. 3B is schematic diagram 2 of a hardware structure of a picture processing apparatus according to an embodiment of the present disclosure.

In this embodiment of this application, refer to FIG. 3B when the picture processing apparatus is an encoder-side device. The processor may further include a video encoder configured to perform compression encoding on a digital video. The encoder-side device may support one or more video coding formats such as Moving Picture Experts Group (MPEG) 1, MPEG-2, MPEG-3, or MPEG-4. The processor may further include a graphics processing unit (GPU) configured to: perform mathematical and geometric calculation for graphics rendering, execute program instructions to generate or change display information, and the like.

Figure 3C:
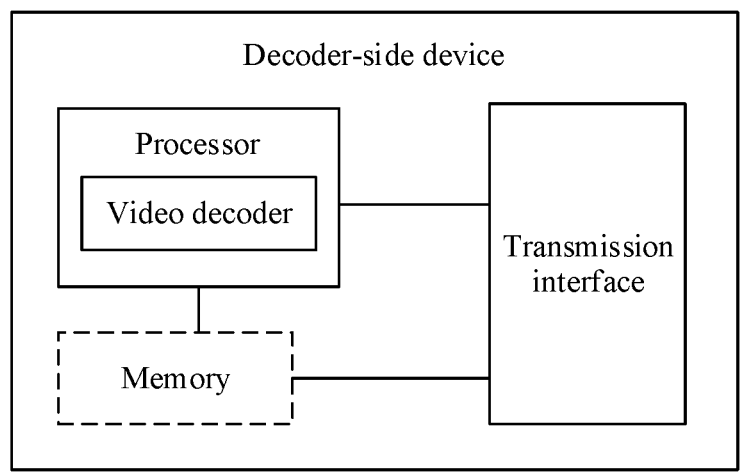
FIG. 3C is schematic diagram 3 of a hardware structure of a picture processing apparatus according to an embodiment of the present disclosure.

Refer to FIG. 3C when the picture processing apparatus is a decoder-side device. The processor may further include a video decoder configured to decode a digital video picture. The decoder-side device may support one or more video codecs. In this case, the decoder-side device may play videos in a plurality of coding formats, for example, MPEG-1, MPEG-2, MPEG-3, or MPEG-4.

Figure 3D:
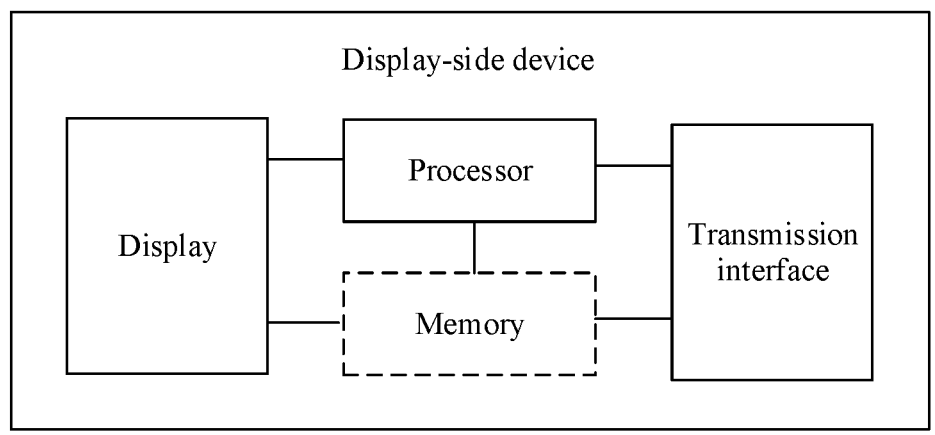
FIG. 3D is schematic diagram 4 of a hardware structure of a picture processing apparatus according to an embodiment of the present disclosure.

Refer to FIG. 3D when the picture processing apparatus is a display-side device. The display-side device further includes a display configured to display a picture. The display includes a display panel. The display panel may be a liquid-crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

In this embodiment of this application, the encoder-side device can perform processing such as graphics rendering, encoding, and sending on a picture in a video stream. The decoder-side device can receive and decode a picture in a video stream. When the encoder-side device or the decoder-side device determines, based on the 1st sub-picture of a frame of picture in the video stream, that a picture quality problem such as picture tearing is to occur, the display-side device displays a previous frame of picture instead of the current picture in which picture tearing is to occur. This avoids picture tearing of the current frame of picture as much as possible and improves picture quality of the entire video stream and video watching experience of a user.

The following describes a picture processing method provided in embodiments of the present disclosure from the perspective of an encoder-side device, a decoder-side device, and a display-side device. It may be understood that any more of the encoder-side device, the decoder-side device, and the display-side device may be integrated into one physical device (e.g., the decoder-side device and the display-side device may be integrated into one physical device), or may be independent physical devices. This is not limited in embodiments of this application.

For ease of description, the encoder-side device is an encoder side for short, the decoder-side device is a decoder side for short, and the display-side device is a display side for short.

In a picture processing method provided in embodiments of this application, the decoder side determines whether a picture quality problem, for example, picture tearing, is to occur. The method may include a plurality of picture quality problem detection solutions, which are separately described below.

Figure 4A:
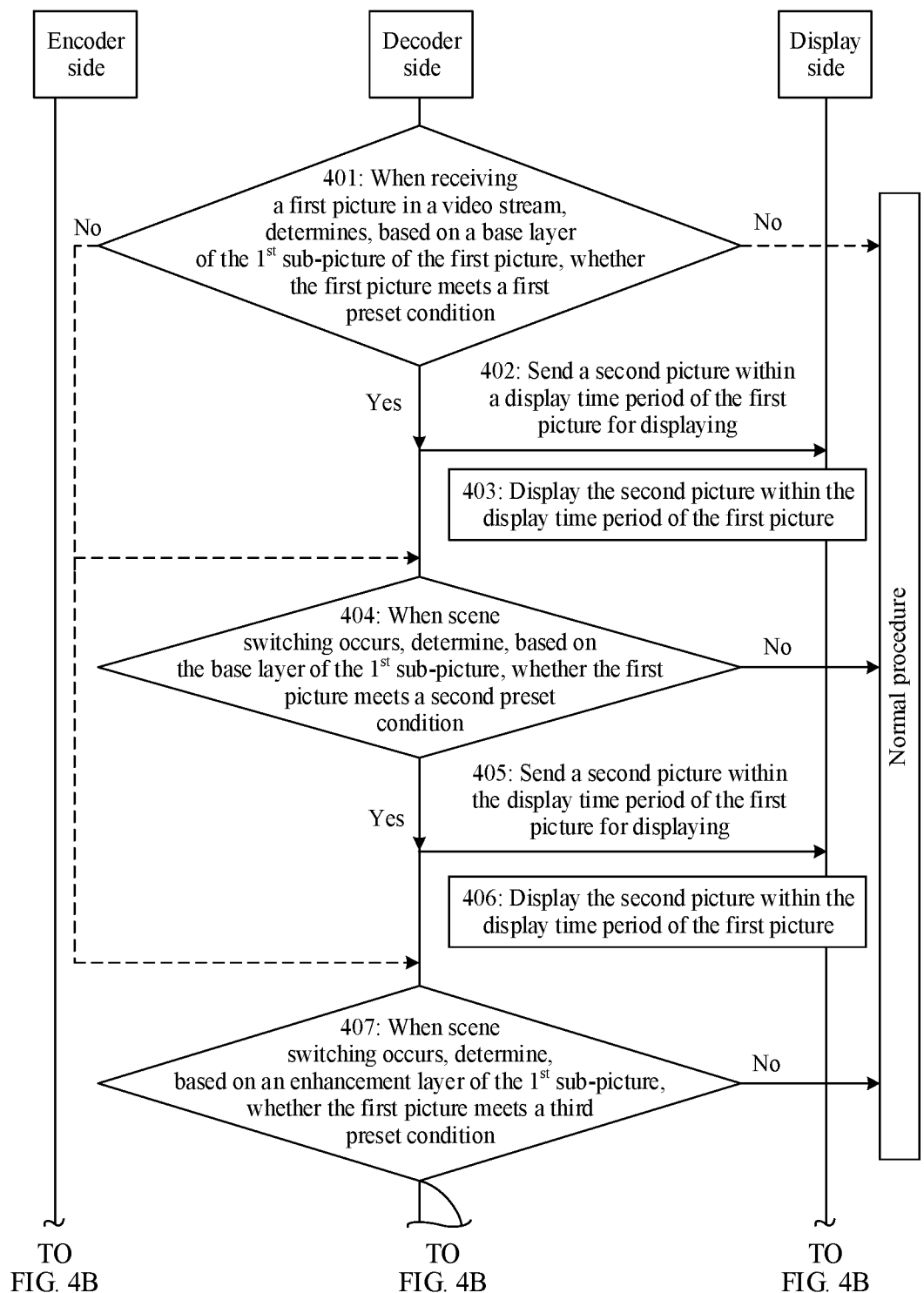
FIG. 4A and FIG. 4B are a flowchart of a picture processing method according to an embodiment of the present disclosure.

(1) Detect, based on a base layer of the 1st sub-picture of a first picture, whether a picture tearing problem is to occur. Refer to FIG. 4A. The process may include the following steps.

401: When receiving a first picture in a video stream, the decoder side determines, based on a base layer of the 1st sub-picture of the first picture, whether the first picture meets a first preset condition.

The first picture may be any frame of picture in the video stream sent by the encoder side to the decoder side. As described above, in a plurality of application scenarios (such as a wireless short-distance projection scenario, e.g., game projection), the encoder side may send the video stream to the decoder side in a plurality of wireless transmission modes (such as Wi-Fi and Bluetooth).

Figure 5:
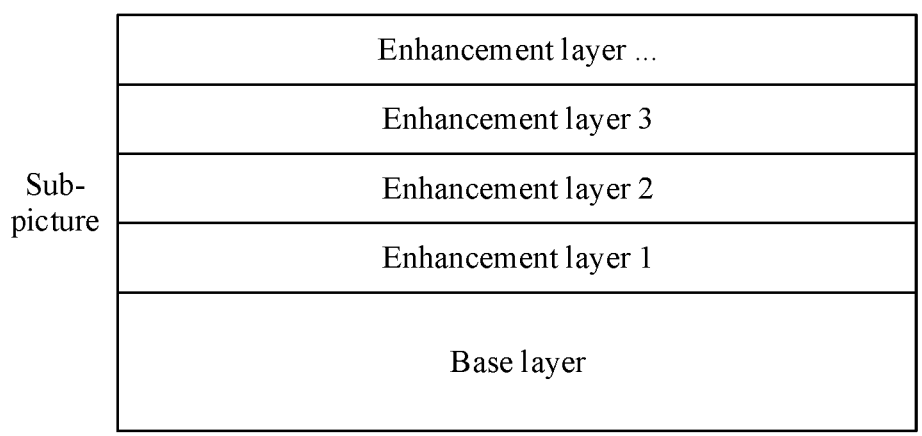
FIG. 5 is a schematic diagram of a layer structure of a sub-picture according to an embodiment of the present disclosure.

In this embodiment of this application, each frame of picture in the video stream may include a plurality of sub-pictures when a sub-frame-level picture processing mode is used. The sub-picture may also be referred to as a slice, a tile, or the like. Refer to FIG. 5. Each of the sub-pictures may include a base layer and at least one enhancement layer. The base layer may include basic content of the picture, and the enhancement layer may be used to ensure higher picture quality. During transmission of each of the sub-pictures in the video stream, the base layer is transmitted before the enhancement layer.

The 1st sub-picture is a sub-picture that is first processed (including encoded, transmitted, decoded, and the like) in each frame of picture. For example, the 1st sub-picture may be the top-left sub-picture of each frame of picture. That is, the 1st sub-picture of the first picture may be the top-left sub-picture of the first picture.

For the first picture, the decoder side first receives the 1st sub-picture of the first picture, and then receives other sub-pictures of the first picture. For the 1st sub-picture, the decoder side first receives the base layer of the 1st sub-picture, and then receives an enhancement layer of the 1st sub-picture.

In step 401, when receiving the first picture in the video stream, the decoder side determines, based on the received base layer of the 1st sub-picture, whether the first picture meets the first preset condition. The first preset condition is used to determine whether a picture tearing problem is to occur in the first picture. To be specific, the decoder side determines, based on the received base layer of the 1st sub-picture, whether the picture tearing problem is to occur in the first picture.

402: The decoder side sends a second picture within a display time period of the first picture for displaying if the first picture meets the first preset condition.

403: The display side displays the second picture within the display time period of the first picture.

In steps 402 and 403, if the first picture meets the first preset condition, the decoder side determines that the picture tearing problem is to occur in the first picture. In this case, the decoder side sends the second picture within the display time period of the first picture for displaying instead of the first picture, so that the display side displays the second picture within the display time period of the first picture instead of the first picture in which the picture tearing problem is to occur.

The second picture is a picture that is in the video stream and that is sent within a first display time period for displaying, and the first display time period is a picture display time period before the display time period of the first picture. For example, the first picture is a picture frame i in the video stream, and the first display time period is a display time period corresponding to a picture frame i−1. The second picture is the picture frame i−1 if the display side displays the picture frame i−1 within the display time period of the picture frame i−1. The display side displays the picture frame i−1 within a display time period of the picture frame i. For another example, the second picture is a picture frame i−2 if the display side displays the picture frame i−2 within a display time period of a picture frame i−1. The display side displays the picture frame i−2 within a display time period of a picture frame i.

In this case, the picture tearing problem occurs in the first picture, no picture tearing problem occurs in the second picture, and a probability that a picture tearing problem continuously occurs between adjacent picture frames is low. Therefore, displaying the second picture within the display time period of the first picture when the picture tearing problem is to occur in the first picture can reduce a picture tearing probability, avoid the picture tearing problem of the first picture as much as possible, and improve picture quality of the entire video stream and video watching experience of a user.

In addition, for the first picture, when receiving the earliest transmitted 1st sub-picture of the first picture, the decoder side may determine, based on the base layer of the 1st sub-picture, whether picture tearing is to occur in the first picture, so as to perform anti-tearing processing as soon as possible in a timely manner when picture tearing is to occur, and reduce as much as possible a picture display delay caused by anti-tearing processing on the first picture.

Compared with performing tearing detection based on a subsequent picture of the 1st sub-picture of the first picture, performing tearing detection based on the 1st sub-picture can determine, immediately after the 1st sub-picture is received, whether picture tearing is to occur. In this case, anti-tearing processing can be performed in a timely manner, and the second picture is displayed. This can reduce a picture display delay caused within the display time period of the first picture. For example, in a game projection scenario, the picture display delay caused within the display time period of the first picture is large if tearing detection and anti-tearing processing are performed based on the subsequent picture of the 1st sub-picture of the first picture. Consequently, a user may easily find, on the display side, cases such as frame freezing of a game picture. In addition, to reduce a picture display delay as much as possible, in a normal process in which no picture tearing is detected, after receiving the 1st sub-picture of the first picture, the decoder side sends the 1st sub-picture for displaying, to display the 1st sub-picture as soon as possible.

For example, in some embodiments, the first preset condition may include: the base layer that is of the 1st sub-picture of the first picture and that is received by the decoder side is lost or partially lost. The base layer that is of the 1st sub-picture of the first picture and that is received by the decoder side is prone to be lost or partially lost when a channel bandwidth between the encoder side and the decoder side is low or channel interruption occurs. Because the base layer includes basic content of the picture, the 1st sub-picture cannot be displayed when the base layer that is of the 1st sub-picture of the first picture and that is received by the decoder side is lost or partially lost, that is, when the decoder side does not receive the complete base layer of the 1st sub-picture. In this case, picture tearing is to occur in the first picture.

In addition, because an amount of data at a base layer of a picture is small and the base layer is easy to receive successfully, there is a small probability of loss or partial loss of base layers of a plurality of frames of consecutive pictures is small, there is a small probability of picture tearing in a second picture displayed by the display side within the display time period of the first picture, and there is a high probability of success in anti-tearing processing of the first picture.

In addition, when receiving the earliest transmitted base layer of the 1st sub-picture, the decoder side may determine, based on the base layer, whether picture tearing is to occur in the first picture, so as to perform anti-tear processing as soon as possible in a timely manner when picture tearing is to occur, and reduce as much as possible a picture display delay caused by anti-tearing processing on the first picture.

Figure 6:
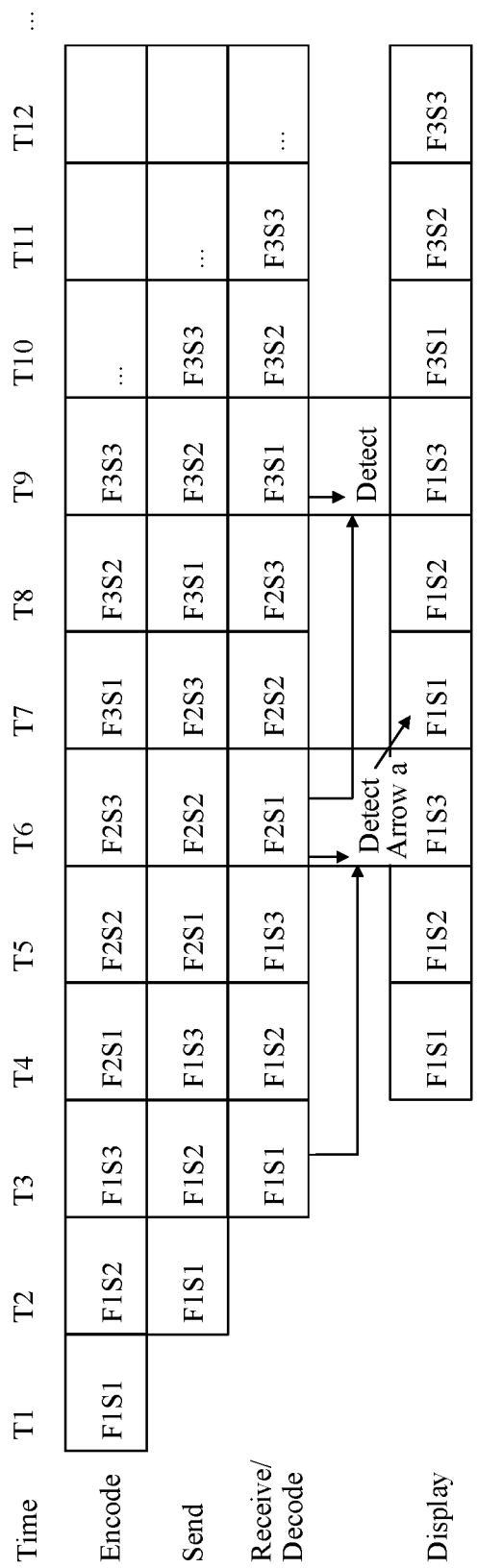
FIG. 6 is a schematic diagram of a picture processing procedure according to an embodiment of the present disclosure.

For example, refer to FIG. 6. The encoder side completes encoding of a sub-picture slice within unit time T. The sub-picture is marked as FnSm, where n represents a quantity of frames, and m represents a quantity of slices. For example, F2S1 represents the 1st sub-picture of a second frame of picture. In the picture processing method provided in this embodiment of this application, for the 1st slice (e.g., F1S1, F2S1, or F3S1) of each frame of picture, the decoder side performs picture tearing detection based on the first preset condition. For example, if it is not detected, based on F1S1, that picture tearing is to occur in a first frame of picture, the first frame of picture is displayed according to a normal procedure within a display time period corresponding to the first frame of picture. If it is detected, based on F2S1, that picture tearing is to occur in the second frame of picture, an anti-tearing mode can be enabled at an arrow a, to repeatedly display the first frame of picture, that is, F1S1, F1S2, and F1S3, displayed within a display time period of a previous picture instead of F2S1, F2S2, and F2S3 of the second frame of picture. Then, the decoder side automatically exits the anti-tear mode. In the following, if it is not detected, based on F3S1, that picture tearing is to occur in a third frame of picture, the third frame of picture is displayed according to a normal procedure within a display time period corresponding to the third frame of picture. It can be learned from FIG. 6 that, for each frame of picture, a display time period is later than a receiving/decoding period, and the receiving/decoding period is later than an encoding period.

In addition, in an anti-tearing processing procedure, the decoder side may put the successfully received sub-picture (including the base layer and the enhancement layer) into a buffer, to provide a decoding reference for a received subsequent picture frame.

In the picture processing method provided in this embodiment of this application, if the decoder side does not detect, based on the first preset condition, that picture tearing is to occur in the first picture, the decoder side receives and decodes the first picture according to a normal procedure in a conventional technology, and sends the first picture within the display time period of the first picture for displaying.

It should be noted that the first picture may be any picture in the video stream, that is, picture tearing detection and anti-tearing processing may be performed on each frame of picture in the video stream by using the method described in the foregoing steps 401 to 403, to improve picture quality of the entire video stream and video watching experience of a user.

Figure 4B:
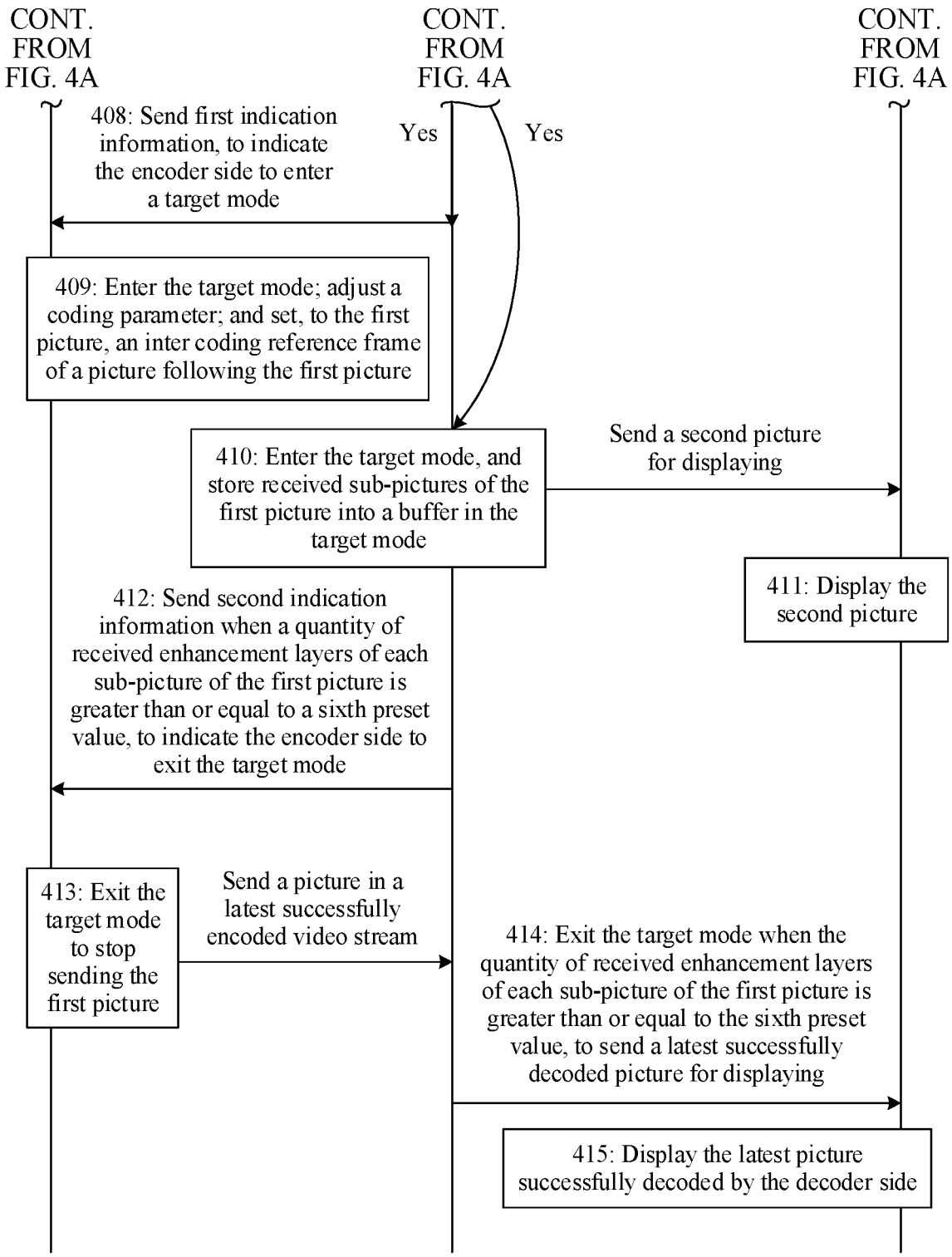

In some embodiments of this application, refer to FIG. 4A and FIG. 4B. After step 401, when the first preset condition is not met, for example, when the base layer of the 1st sub-picture of the first picture is successfully received, the picture processing method provided in this embodiment of the present disclosure may further include a process described in steps 404 to 406, or may include a process described in steps 407 to 415. In other words, after anti-tearing detection is performed based on a base layer of the 1st sub-picture of each frame of picture, when scene switching occurs, whether a picture tearing problem is to occur may be further predicted based on the base layer of the 1st sub-picture of the current picture, and/or whether a picture blurring problem occurs may be further predicted based on an enhancement layer of the 1st sub-picture of the current picture; and corresponding preventive processing is performed for these picture quality problems.

In some other embodiments of this application, a solution described in steps 404 to 406, a solution described in steps 407 to 415, and a solution described in steps 401 to 403 are independent and parallel picture processing solutions. The solution described in steps 404 to 406 and the solution described in steps 407 to 415 may be separately executed without meeting the first preset condition.

The following separately describes in detail the picture processing solution described in steps 404 to 406 corresponding to (2) and the picture processing solution described in steps 407 to 415 corresponding to (3).

(2) When scene switching occurs, predict, based on a base layer of the 1st sub-picture of a first picture, whether a picture tearing problem is to occur. Refer to FIG. 4A. The process may include the following steps.

404: When scene switching occurs, the decoder side determines, based on the base layer of the 1st sub-picture of the first picture, whether the first picture meets a second preset condition.

The second preset condition is used to predict whether a picture tearing problem is to occur in the first picture, that is, the decoder side predicts, based on the base layer that is of the 1st sub-picture and that is to be received first, whether the picture tearing problem is to occur in the first picture.

Content of two adjacent frames of pictures differs greatly before and after scene switching. An amount of data at a base layer of a picture after scene switching may increase compared with that of a picture before scene switching. Therefore, a possibility of loss of the base layer is higher, and a probability of picture tearing is also higher.

In addition, because the first picture in a scene switching scenario lacks a reference picture frame, an amount of encoded data at the base layer of the first picture increases significantly. Consequently, a possibility of transmission loss and a probability of picture tearing increase.

In addition, a picture tearing phenomenon in a picture during scene switching is more prone to attract attention of a user, and impact of the picture tearing phenomenon on subjective experience of the user is more obvious and intense.

In this case, in this embodiment of this application, during scene switching, the decoder side may predict, based on the base layer of the 1st sub-picture of the first picture, whether the picture tearing problem is to occur in the first picture, and perform anti-tearing processing as soon as possible in a timely manner when it is predicted that the picture tearing problem is to occur.

In some embodiments, the decoder side may determine, based on an area of an intra coding block of the 1st sub-picture, an amount of encoded data of the 1st sub-picture, or another factor, whether scene switching occurs. For example, that scene switching occurs includes: a ratio of an area of an intra coding block of the 1st sub-picture of the first picture to a total area of the 1st sub-picture of the first picture is greater than or equal to a thirteenth preset value, and/or a ratio of an amount of encoded data of the 1st sub-picture of the first picture to an amount of encoded data of a reference sub-picture of a third picture is greater than or equal to a fourteenth preset value. The third picture is a previous frame of picture of the first picture in the video stream, and the reference sub-picture is a sub-picture whose position corresponds to that of the 1st sub-picture of the first picture and that is of the third picture.

When the ratio of the area of the intra coding block of the 1st sub-picture of the first picture to the total area of the 1st sub-picture of the first picture is greater than or equal to the thirteenth preset value, it may indicate that the area of the intra coding block of the 1st sub-picture is larger, an area of an inter-coding block of the 1st sub-picture is smaller, correlation between the 1st sub-picture and the previous frame of picture of the first picture is low, and content of the first picture greatly differs from that of the previous frame of picture. In this case, scene switching may occur currently.

When the ratio of the amount of the encoded data of the 1st sub-picture of the first picture to the amount of the encoded data of the reference sub-picture of the third picture is greater than or equal to the fourteenth preset value, it may indicate that content of the 1st sub-picture of the first picture greatly differs from that of the 1st sub-picture of the previous frame of picture, and content of the first picture greatly differs from that of the previous picture. In this case, scene switching may occur currently.

There may be a plurality of specific application scenarios of scene switching. For example, in an office scenario, the video stream is a PPT picture stream. When a next PPT picture is played, if content of the next PPT picture greatly differs from that of a current PPT picture, it may be considered that scene switching occurs. For another example, when a picture in the video stream is switched from a simple image to a complex image with rotation, it may be considered that scene switching occurs. For another example, when a scene corresponding to picture content is changed from an indoor scene to an outdoor scene, it may be considered that scene switching occurs. For another example, when a working window is opened/closed, it may be considered that scene switching occurs.

405: The decoder side sends a second picture within the display time period of the first picture for displaying if the first picture meets the second preset condition.

406: The display side displays the second picture within the display time period of the first picture.

In steps 405 and 406, if the first picture meets the second preset condition, the decoder side predicts that a picture tearing problem is to occur in the first picture. In this case, the second picture instead of the first picture is sent within the display time period of the first picture for displaying, so that the display side displays the second picture within the display time period of the first picture instead of the first picture in which the picture tearing problem is to occur.

In some embodiments, the decoder side may predict, based on a current receiving bit rate, an instantaneous bandwidth, an average bandwidth, or the like, whether picture tearing is to occur in the first picture.

For example, the second preset condition may include: a ratio of an amount of encoded data at the base layer that is of the 1st sub-picture of the first picture and that is received by the decoder side within first preset duration to a first channel bandwidth is greater than or equal to a first preset value, and a ratio of the amount of the encoded data at the base layer that is of the 1st sub-picture of the first picture and that is received within the first preset duration to a second channel bandwidth is greater than or equal to a second preset value. The first channel bandwidth is an average bandwidth within the first preset duration, the second channel bandwidth is an average bandwidth within second preset duration, and the second preset duration is greater than the first preset duration.

The first preset duration is short, and may be understood as unit duration. For example, the first preset duration may be 0.001 s, 0.04 s, 0.004 s, 0.1 s, or the like. The first channel bandwidth within the first preset duration is an average bandwidth in a short time window, and may be understood as an instantaneous bandwidth. The amount of the encoded data at the base layer that is of the 1st sub-picture of the first picture and that is received within the first preset duration may be understood as a receiving bit rate (or referred to as a receiving bit stream) used after the base layer of the 1st sub-picture of the first picture is encoded. The second channel bandwidth is an average bandwidth (or referred to as a statistical average channel bandwidth) in a long time window corresponding to the second preset duration. For example, the second preset duration may be 1 s, 5 s, 10 s, or the like. A specific time length of the first preset duration and the second preset duration is not specifically limited in this embodiment of this application. It should be understood that the time window corresponding to the first preset duration is located in the time window corresponding to the second preset duration. For example, the time window corresponding to the second preset duration may be obtained by extending, forward or backward along a time axis, the time window corresponding to the first preset duration. The first preset value and the second preset value may be values less than 1 and close to 1, for example, 0.8, 0.9, or 0.95, and the first preset value and the second preset value may be the same or different.

When a ratio of the receiving bit rate used after the base layer of the 1st sub-picture is encoded to the instantaneous bandwidth is greater than or equal to the first preset value (e.g., 0.8), and a ratio of the receiving bit rate used after the base layer of the 1st sub-picture is encoded to the average bandwidth is greater than or equal to the second preset value (e.g., 0.9), it may indicate that the amount of the encoded data at the base layer of the 1st sub-picture is large. A current channel bandwidth is close to the receiving bit rate, the current channel bandwidth may be insufficient to transmit a complete base layer of a subsequent sub-picture of the first picture, and the decoder side may be incapable of receiving the complete base layer of the subsequent sub-picture of the first picture. Therefore, the decoder side predicts that picture tearing is to occur in the first picture.

In this way, similar to steps 401 to 403, in steps 404 to 406, because the picture tearing problem occurs in the first picture, no picture tearing problem may occur in the second picture, and a probability that a picture tearing problem continuously occurs between pictures is low. Therefore, displaying the second picture within the display time period of the first picture when the picture tearing problem is to occur in the first picture can reduce a picture tearing probability, avoid the picture tearing problem of the first picture as much as possible, and improve picture quality of the entire video stream and video watching experience of a user.

In addition, for the first picture, when receiving the earliest transmitted 1st sub-picture of the first picture, the decoder side may determine, based on the base layer of the 1st sub-picture, whether picture tearing is to occur in the first picture, so as to perform anti-tearing processing as soon as possible in a timely manner when picture tearing is to occur, and reduce as much as possible a picture display delay caused by anti-tearing processing on the first picture.

In an anti-tearing processing procedure, the decoder side may put the successfully received sub-picture (including the base layer and the enhancement layer) into a buffer, to provide a decoding reference for a received subsequent picture frame.

In addition, if the decoder side does not predict, based on the second preset condition, that picture tearing is to occur in the first picture, the decoder side receives and decodes the first picture according to a normal procedure in a conventional technology, and sends the first picture within the display time period of the first picture for displaying.

It should be noted that, in the solution described in the foregoing steps 404 to 406, because a picture tearing problem is prone to occur when scene switching occurs, tearing prediction and anti-tearing processing are performed based on the 1st sub-picture only when scene switching occurs. In addition, a delay caused by anti-tearing processing during scene switching is not prone to be perceived by the user; therefore, watching experience of the user is not prone to be affected. This can avoid a case, for example, a picture display delay or playback freezing, caused by picture tearing prediction and anti-tearing processing that are performed on each frame of picture when scene switching does not occur.

In the solutions described in steps 401 to 406, an anti-tearing mode may be enabled after the decoder side determines, based on the first preset condition, that picture tearing is to occur in the first picture, or after the decoder side predicts, based on the second preset condition, that picture tearing is to occur in the first picture. In this case, in the anti-tearing mode, the second picture is displayed within the display time period of the first picture, and then the anti-tearing mode is automatically exited. That is, the anti-tearing mode is valid only for a frame of picture in which a picture tearing problem is to occur currently, and does not affect a next frame of picture. The anti-tearing mode is intended to resolve a picture tearing problem occurring when a scene changes significantly.

In the solutions described in steps 401 to 406, when determining or predicting, based on the 1st sub-picture of a frame of picture in the video stream, that a picture tearing problem is to occur, the decoder side can display a previously displayed frame of picture instead of a current picture in which picture tearing is to occur. This avoids picture tearing of the first frame of picture as much as possible, and improves picture quality of the entire video stream and video watching experience of the user.

(3) When scene switching occurs, predict, based on an enhancement layer of the 1st sub-picture of a first picture, whether a picture blurring problem is to occur. Refer to FIG. 4A and FIG. 4B. The process may include the following steps.

407: When scene switching occurs, the decoder side determines, based on an enhancement layer of the 1st sub-picture of the first picture, whether the first picture meets a third preset condition.

For descriptions of scene switching, refer to related descriptions in step 404. The third preset condition is used to predict whether a picture blurring problem is to occur in the first picture. To be specific, the decoder side predicts, based on the enhancement layer of the 1st sub-picture, whether the picture blurring problem is to occur in the first picture.

Content of two adjacent frames of pictures differs greatly before and after scene switching. An amount of data at an enhancement layer of a picture after scene switching may increase compared with that of a picture before scene switching. Therefore, a possibility of loss (including complete loss or partial loss) of the enhancement layer is higher, and a probability of picture blurring is also higher.

In addition, because the first picture in a scene switching scenario lacks a reference picture frame, an amount of encoded data at the enhancement layer of the first picture increases significantly. Consequently, a possibility of transmission loss and a probability of picture blurring increase.

In addition, the picture blurring problem during scene switching a user's attention. In particular, a picture blurring phenomenon that occurs in a still image obtained after scene switching is more prone to be perceived by the user, and impact of the picture blurring phenomenon on subjective experience of the user is more obvious and stronger. In addition, an amount of data at an enhancement layer of a picture is greater than that at a base layer, and similarity between a plurality of frames of adjacent pictures is larger after scene switching. If an enhancement layer of the first picture is prone to be lost during scene switching, enhancement layers of a plurality of frames of other pictures following the first picture is also prone to be lost because of lacking of a reference picture frame. As a result, a blurring problem is prone to occur in a plurality of frames of consecutive pictures within a long period of time, and video watching experience of the user is affected.

In this case, in this embodiment of this application, during scene switching, the decoder side may predict, based on the enhancement layer of the 1st sub-picture of the first picture, whether a picture blurring problem is to occur in the first picture, and perform anti-blurring processing as soon as possible in a timely manner when it is predicted that the picture blurring problem is to occur.

408: The decoder side sends first indication information to the encoder side if the first picture meets a third preset condition, to indicate the encoder side to enter a target mode.

If the first picture meets the third preset condition, the decoder side predicts that the picture blurring problem is to occur in the first picture, and may indicate the encoder side to enter the target mode.

In some embodiments, the decoder side may predict, based on a current receiving bit rate, an instantaneous bandwidth, an average bandwidth, or the like, whether a picture blurring problem is to occur in the first picture.

For example, the third preset condition may include: a quantity of enhancement layers that are of the 1st sub-picture of the first picture and that are received by the decoder side is less than or equal to a third preset value; or a ratio of an amount of encoded data at an enhancement layer that is of the 1st sub-picture of the first picture and that is received by the decoder side within third preset duration to a third channel bandwidth is greater than or equal to a fourth preset value, and a ratio of the amount of the encoded data at the enhancement layer that is of the 1st sub-picture of the first picture and that is received by the decoder side within the third preset duration to a fourth channel bandwidth is greater than or equal to a fifth preset value. The third channel bandwidth is an average bandwidth within the third preset duration, the fourth channel bandwidth is an average bandwidth within fourth preset duration, and the fourth preset duration is greater than the third preset duration.

If the quantity of enhancement layers that are of the 1st sub-picture of the first picture and that are received by the decoder side is less than or equal to the third preset value, it may indicate that the decoder side does not receive sufficient enhancement layers, quality of the first picture is poor, and there is a low probability that sufficient enhancement layers of a subsequent sub-picture of the first picture are received. As a result, the decoder side predicts that a picture blurring phenomenon is to occur in the first picture.

The third preset duration is short, and may be understood as unit duration. For example, the third preset duration may be 0.001 s, 0.04 s, 0.004 s, 0.1 s, or the like. The third channel bandwidth within the third preset duration is an average bandwidth in a short time window, and may be understood as an instantaneous bandwidth. The amount of the encoded data at the enhancement layer that is of the 1st sub-picture of the first picture and that is received within the third preset duration may be understood as a receiving bit rate used after the enhancement layer of the 1st sub-picture of the first picture is encoded. The fourth channel bandwidth is an average bandwidth within a long time window corresponding to the fourth preset duration. For example, the fourth preset duration may be 1 s, 5 s, 10 s, or the like. It should be understood that the time window corresponding to the third preset duration is located in the time window corresponding to the fourth preset duration. For example, the time window corresponding to the fourth preset duration may be obtained by extending, forward or backward along the time axis, the time window corresponding to the third preset duration. A specific time length of the third preset duration and the fourth preset duration is not specifically limited in this embodiment of this application. The fourth preset value and the fifth preset value may be values less than 1 and close to 1, for example, 0.8, 0.9, or 0.95, and the fourth preset value and the fifth preset value may be the same or different.

When a ratio of the receiving bit rate used after the enhancement layer of the 1st sub-picture is encoded to the instantaneous bandwidth is greater than or equal to the third preset value (e.g., 0.85), and a ratio of the receiving bit rate used after the enhancement layer of the 1st sub-picture is encoded to the average bandwidth is greater than or equal to the fourth preset value (e.g., 0.95), it may indicate that the amount of the encoded data at the enhancement layer of the 1st sub-picture is large. A current channel bandwidth is close to the receiving bit rate, the current channel bandwidth may be insufficient to transmit all enhancement layers or sufficient enhancement layers of a subsequent sub-picture of the first picture, and the decoder side may be incapable of receiving all the enhancement layers or the sufficient enhancement layers of the subsequent sub-picture of the first picture. As a result, the decoder side predicts that a picture blurring problem is to occur in the first picture, and a picture blurring problem is also to occur in the subsequent picture.

For the first picture, when receiving the earliest transmitted 1st sub-picture of the first picture, the decoder side may determine, based on the enhancement layer of the 1st sub-picture, whether picture blurring is to occur in the first picture, so as to perform anti-blurring processing as soon as possible in a timely manner when picture blurring is to occur, and reduce a picture display delay caused by anti-blurring processing on the first picture.

The target mode may be referred to as an anti-blurring mode. When predicting, based on the third preset condition, that a picture blurring problem is to occur in the first picture, the decoder side may send the first indication information to the encoder side, so as to indicate the encoder side to enter an anti-blurring mode and perform a corresponding processing operation in the anti-blurring mode. For example, the first indication information may be an anti-blurring mode flag. An objective of the anti-blurring mode is to resolve a problem of long-term picture blurring occurring when a scene following a still scene changes greatly.

409: In a process of sending the first picture in the video stream to the decoder side, the encoder side enters the target mode after receiving the first indication information from the decoder side, and adjusts a coding parameter in the target mode, to reduce an amount of encoded data of another sub-picture following the 1st sub-picture of the first picture; set, to the first picture, an inter-coding reference frame of a picture following the first picture; and the encoder side enters the anti-blurring mode after receiving the first indication information from the decoder side. The encoder side adjusts the coding parameter in the anti-blurring mode, for example, increases a discrete cosine transform quantization parameter QP, so that a coding compression rate is higher. In this way, an amount of encoded data of another sub-picture following the 1st sub-picture of the first picture is reduced, so that the encoded data of the another sub-picture following the 1st sub-picture of the first picture can be successfully sent to the decoder side in the case of a current channel.

In the anti-blurring mode, the encoder side continuously sends the first picture, so that the decoder side can receive sufficient enhancement layers of each sub-picture of the first picture, that is, the decoder side can receive the good-quality picture. In addition, in the anti-blurring mode, the encoder side may further set, to the first picture, an inter-coding reference frame of each of pictures following the first picture, so that another frame of picture following the first picture is inter-coded in the anti-blurring mode by using the first picture as a reference. In this way, when receiving the another frame of picture following the first picture, the decoder side can perform decoding by using the received first picture as the reference. For example, it is assumed that a picture frame a and a picture frame b are included behind the first picture. In the anti-blurring mode, the encoder side has encoded the picture frame a and the picture frame b, and the picture frame a and the picture frame b are inter-coded by using the first picture as the reference. If receiving the picture frame a or the picture frame b, the decoder side may perform decoding by using the received first picture as the reference.

In addition, the encoder side sets, to the first picture, the inter-coding reference frame of each of the pictures following the first picture, to provide a good coding reference for inter-coding a subsequent picture frame of the first picture after scene switching. In this way, an amount of encoded data of the subsequent picture frame decreases, so that the encoded data of the subsequent picture frame can be successfully transmitted in the case of a low current channel bandwidth. This improves long-term picture blurring and picture display effect.

In the anti-blurring mode, the encoder side fixedly sets, to the first picture, an inter-coding reference frame of a picture following the first picture, to avoid a case in which a decoding reference frame is lacking when the decoder side receives another frame of picture following the first picture. For example, it is assumed that a picture frame a and a picture frame b are included behind the first picture, and the encoder side has encoded the picture frame a and the picture frame b in the anti-blurring mode. In this case, if the picture frame b inter-coded by using the picture frame a as a reference instead of by using the first picture as a reference, and the decoder side receives the picture frame b but does not receive the picture frame a, a decoding reference frame is lacking for the picture frame b.

410: If the first picture meets the third preset condition, the decoder side enters the target mode, sends a second picture in the target mode for displaying, and stores received sub-pictures of the first picture into a buffer.

The decoder side may enter the anti-blurring mode when predicting, based on the third preset condition, that a picture blurring problem is to occur in the first picture. In anti-blurring mode, the decoder side can continuously receive the first picture in response to an operation of continuously sending the first picture by the encoder side.

In addition, in the anti-blurring mode, in a process of continuously receiving the first picture, the decoder side may send the second picture for displaying, so that the display side displays the second picture instead of the current first picture in which blurring is to occur. This avoids picture blurring of a current frame of picture as much as possible and improves picture quality of the entire video stream and video watching experience of the user. Because duration for continuously receiving the first picture is uncertain, duration for sending, by the decoder side, the second picture for displaying is also uncertain, and may be one picture display time period (display duration for displaying one frame of picture), or may be a plurality of picture display time periods. For example, one picture display time period may be 0.04 s.

The decoder side may further store the received sub-pictures of the first picture into the buffer (that is, a buffer of a decoder), so that the decoder side may decode, by using the sub-pictures of the first picture as a reference, another received subsequent picture that the first picture as an inter-coding reference frame.

411: The display side displays the second picture.

The display side displays the second picture after receiving the second picture sent by the decoder side for displaying. It should be noted that, compared with the duration for sending, by the decoder side, the second picture for displaying, duration for displaying the second picture by the display side is also uncertain, and may be one picture display time period, or may be a plurality of picture display time periods.

412: The decoder side sends second indication information to the encoder side when the quantity of received enhancement layers of each sub-picture of the first picture is greater than or equal to a sixth preset value, to indicate the encoder side to exit the target mode.

In a process of continuously receiving the first picture, if determining that the quantity of enhancement layers of each sub-picture of the first picture is greater than or equal to the sixth preset value, the decoder side may determine that the first picture of good quality has been received. Therefore, the second indication information may be used to indicate the encoder side to exit the anti-blurring mode, so that the encoder side stops sending the first picture.

413: The encoder side exits the target mode after receiving the second indication information from the decoder side, to stop sending the first picture to the decoder side and send a picture in a latest successfully encoded video stream to the decoder side.

The encoder side exits the anti-blurring mode based on the second indication information after receiving the second indication information sent by the decoder side, to stop sending the first picture and send the latest successfully encoded video frame to the decoder side. For example, if the latest successfully encoded picture frame is the picture frame b after the encoder side exits the anti-blurring mode, the encoder side may send the picture frame b to the decoder side. However, the picture frame a encoded before the picture frame b is no longer sent to the decoder side during the period within which the encoder side continuously sends the first picture in the anti-blurring mode in step 409.

414: The decoder side exits the target mode when the quantity of received enhancement layers of each sub-picture of the first picture is greater than or equal to the sixth preset value, to send a latest successfully decoded picture for displaying.

415: The display side displays the latest picture successfully decoded by the decoder side.

The latest successfully decoded picture is a picture corresponding to a current display time period. In steps 414 and 415, the decoder side may exit the anti-blurring mode when determining that the quantity of received enhancement layers of each sub-picture of the first picture is greater than or equal to the sixth preset value, and the first picture of good quality has been received, to send the successfully decoded picture (e.g., picture frame b) for displaying. The display side displays the latest successfully decoded picture.

Figure 7:
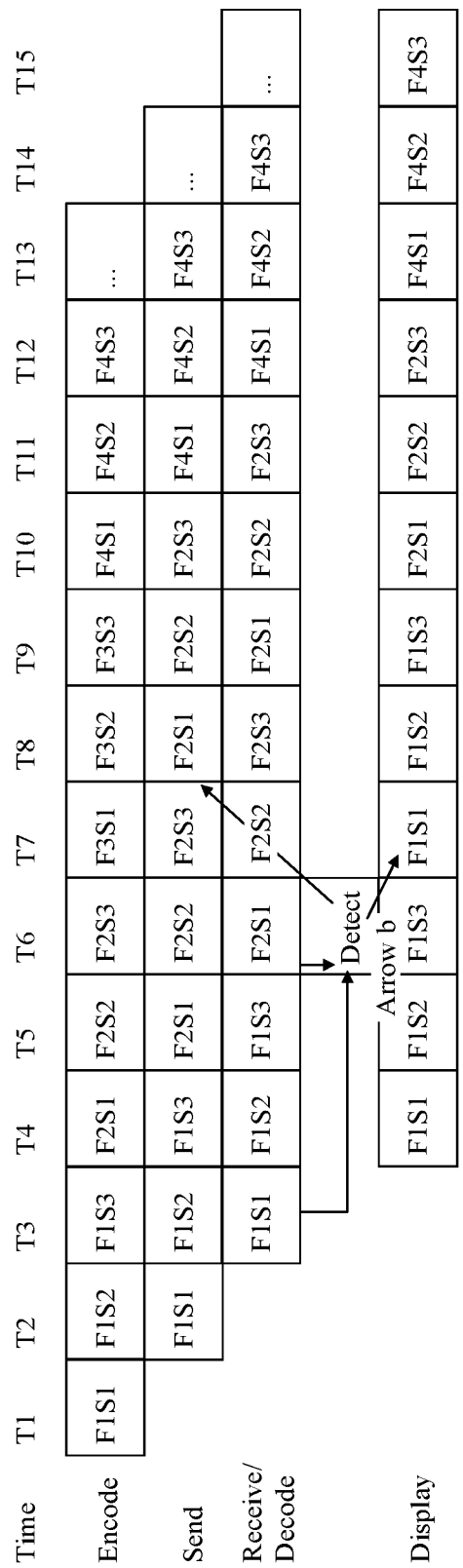
FIG. 7 is a schematic diagram of another picture processing procedure according to an embodiment of the present disclosure.

For example, refer to FIG. 7. The decoder side performs picture blurring detection based on the 1st slice of a picture during scene switching. During scene switching, if the decoder side detects, based on F2S1, that picture tearing is to occur in a second frame of picture, the anti-blurring mode may be enabled at an arrow b, to repeatedly display a first frame of picture displayed within a display time period of a previous picture, that is, F1S1, F1S2, and F1S3, instead of F2S1, F2S2, and F2S3 of a second frame of picture. The anti-blurring mode is exited only after the decoder side determines that the second frame of picture of better quality is received (that is, a quantity of received enhancement layers of each of sub-pictures of the second frame of picture is greater than or equal to the twelfth preset value). As shown in FIG. 7, transmission time of the second frame of picture further occupies a transmission time period of a third frame of picture. After exiting the anti-blurring mode, the decoder side receives and decodes a fourth frame of latest picture, and sends the fourth frame of picture for displaying. As shown in FIG. 7, after repeatedly displaying the first frame of picture, the display side directly displays the fourth frame of latest successfully decoded picture (that is, F4S1, F4S2, and F4S3) instead of the second frame of picture and the third frame of picture.

In addition, if the decoder side does not predict, based on the third preset condition, that picture blurring is to occur in the first picture, the decoder side receives and decodes the first picture according to a normal procedure in the conventional technology, and sends the first picture for displaying within the display time period of the first picture. It should be understood that a target picture is sent within a display time period of the target picture for displaying in a normal procedure.

In the solution described in steps 407 to 415, after predicting, based on the third preset condition, that picture blurring is to occur in the first picture, the decoder side may enable the anti-blurring mode, to continuously send the second picture in the anti-blurring mode for displaying, and exit the anti-blurring mode only after the first picture of good quality is received. The first picture may provide a good reference for encoding/decoding of a subsequent picture frame, reduce an amount of encoded data of the subsequent picture frame, make it easier to successfully transmit the encoded data of the subsequent picture frame to the decoder side for decoding, and avoid a problem that picture blurring occurs for a long period of time.

In this way, when predicting, based on the 1st sub-picture of a frame of picture in the video stream, that a picture blurring problem is to occur, the decoder side can continuously display a previous frame of picture instead of the current picture in which blurring is to occur. This avoids picture blurring of the current frame of picture as much as possible and improves picture quality of the entire video stream and video watching experience of the user.

In other words, during scene switching, the decoder side may predict a receiving/loss status of a subsequent sub-picture of the 1st sub-picture of the first picture based on related information of the base layer or the enhancement layer of the 1st sub-picture and channel bandwidth statistics information, and adjust a coding, transmission, and display strategy based on a prediction result, to improve picture quality problems such as picture blurring and display the complete high-quality picture as much as possible.

In addition, in the solution described in steps 407 to 415, because a picture blurring problem is prone to occur when scene switching occurs, blurring prediction and anti-blurring processing are performed based on the 1st sub-picture only when scene switching occurs. In addition, a delay caused by anti-blurring processing during scene switching is not prone to be perceived by the user; therefore, watching experience of the user is not prone to be affected. This can avoid a case, for example, a picture display delay or playback freezing, caused by picture blurring prediction and anti-blurring processing that are performed on each frame of picture when scene switching does not occur.

In some embodiments of this application, when scene switching occurs, the decoder side may concurrently predict, based on the second preset condition, whether picture tearing is to occur in the first picture and predict, based on the third preset condition, whether picture blurring is to occur in the first picture. In this case, if predicting that picture tearing and picture blurring are to occur in the first picture, the decoder sides performs processing in an anti-blurring manner, to obtain the first picture of good quality and provide a good reference for decoding of a subsequent picture. If neither the anti-tearing mode nor the anti-blurring mode is enabled, low-delay picture displaying is performed according to the normal procedure in the conventional technology.

In the picture processing method provided in the foregoing embodiment of this application, when determining or predicting, based on the 1st sub-picture of a frame of picture in the video stream, that a picture quality problem such as picture tearing or picture blurring is to occur, the decoder side can perform anti-tearing or anti-blurring processing as soon as possible in a timely manner. This avoids a picture quality problem of a currently displayed picture as much as possible, and improves picture quality of the entire video stream and video watching experience of the user.

Figure 8:
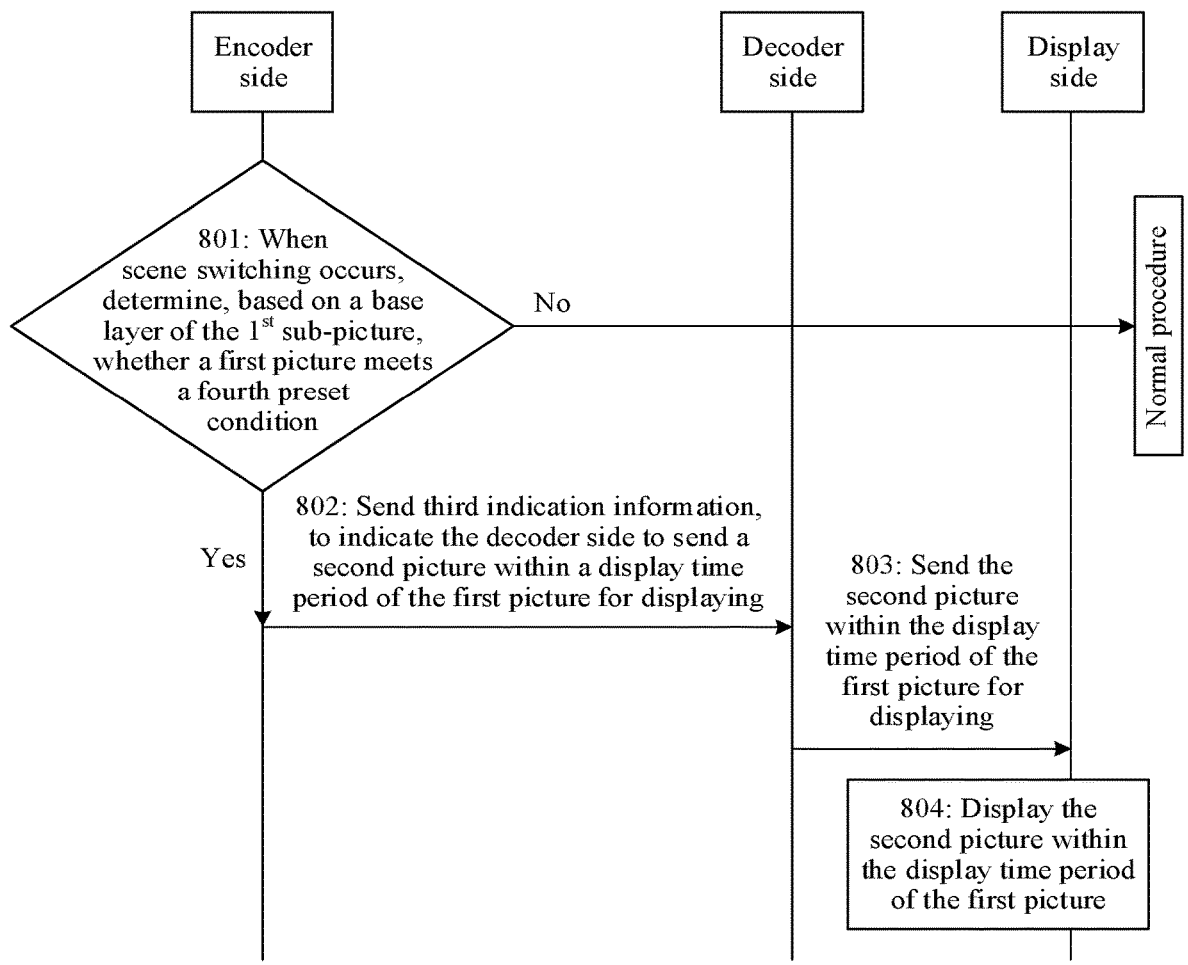
FIG. 8 is a flowchart of another picture processing method according to an embodiment of the present disclosure.

Another embodiment of the present disclosure provides another picture processing method in which an encoder side may predict whether a picture tearing problem is to occur. For example, refer to FIG. 8. The picture processing method may include steps 801 to 804.

It should be noted that a process of predicting, by the encoder side, whether a picture tearing problem is to occur and performing anti-tearing processing in steps 801 to 804 is similar to the process of predicting, by the decoder side, whether a picture tearing problem is to occur and performing anti-tearing processing in steps 404 to 406. For details, refer to related descriptions in steps 404 to 406. The following mainly provides supplementary descriptions of differences.

801: When scene switching occurs, the encoder side determines, based on a base layer of the 1st sub-picture of a first picture in a video stream, whether the first picture meets a fourth preset condition.

For descriptions of scene switching, refer to related descriptions in step 404. The fourth preset condition is used to predict whether a picture tearing problem is to occur in the first picture. To be specific, the encoder side predicts, based on the base layer that is of the 1st sub-picture and that is to be sent first, whether the picture tearing problem is to occur in the first picture.

In some embodiments, the encoder side may predict, based on a current sending bit rate, an instantaneous bandwidth, an average bandwidth, or the like, whether picture tearing is to occur in the first picture.

For example, the fourth preset condition may include: a ratio of an amount of encoded data at the base layer that is of the 1st sub-picture of the first picture and that is successfully sent within fifth preset duration to a fifth channel bandwidth is greater than a seventh preset value, and a ratio of the amount of the encoded data at the base layer that is of the 1st sub-picture of the first picture and that is successfully sent within the fifth preset duration to a sixth channel bandwidth is greater than an eighth preset value. The fifth channel bandwidth is an average bandwidth within the fifth preset duration, the sixth channel bandwidth is an average bandwidth within the sixth preset duration, and the sixth preset duration is greater than the fifth preset duration.

The fifth preset duration is short, and may be understood as unit duration. The amount of the encoded data at the base layer that is of the 1st sub-picture of the first picture and that is received within the fifth preset duration may be understood as a sending bit rate (or referred to as a sending bit stream) used after the base layer of the 1st sub-picture of the first picture is encoded. The fifth channel bandwidth may be understood as an instantaneous bandwidth within unit duration, and the sixth channel bandwidth is an average bandwidth in a long time window corresponding to the sixth preset duration. For example, the fifth preset duration may be 4 ms, and the sixth preset duration may be 1 s. It should be understood that a time window corresponding to the fifth preset duration is located in the time window corresponding to the sixth preset duration. For example, the time window corresponding to the sixth preset duration may be obtained by extending, forward or backward along a time axis, the time window corresponding to the fifth preset duration. The seventh preset value and the eighth preset value may be values less than 1 and close to 1, for example, 0.8, 0.9, or 0.95, and the seventh preset value and the eighth preset value may be the same or different.

When a ratio of the sending bit rate used after the base layer of the 1st sub-picture is encoded to the instantaneous bandwidth is greater than or equal to the seventh preset value (e.g., 0.8), and a ratio of the sending bit rate used after the base layer of the 1st sub-picture is encoded to the average bandwidth is greater than or equal to the eighth preset value (e.g., 0.9), it may indicate that the amount of the encoded data at the base layer of the 1st sub-picture is large. A current channel bandwidth is close to the sending bit rate, the current channel bandwidth may be insufficient to transmit a complete base layer of a subsequent sub-picture of the first picture, and the encoder side may be incapable of successfully sending the complete base layer of the subsequent sub-picture of the first picture. Therefore, the encoder side predicts that picture tearing is to occur in the first picture.

802: If the first picture meets the fourth preset condition, the encoder side sends third indication information to a decoder side, to indicate the decoder side to send a second picture within a display time period of the first picture for displaying.

For descriptions of the second picture, refer to step 403. If the first picture meets the fourth preset condition, the encoder side predicts that a picture tearing problem is to occur in the first picture, and may send the third indication information to the decoder side, to indicate the decoder side to send the second picture within the display time period of the first picture for displaying.

803: In a process of receiving the first picture in the video stream from the encoder side, the decoder side sends the second picture within the display time period of the first picture for displaying if receiving the third indication information from the encoder side.

804: A display side displays the second picture within the display time period of the first picture.

In steps 803 and 804, if receiving the third indication information sent by the encoder side, the decoder side may enter an anti-tearing mode to send the second picture within the display time period of the first picture for displaying, so that the display side displays the second picture within the display time period of the first picture, and then, the decoder side automatically exits the anti-tearing mode. It should be understood that the anti-tearing mode is not a continuous process. After the second picture is displayed within the display time period of the first picture, the current anti-tearing mode ends, and the second picture is not continuously displayed within a next display time period. Theoretically, tearing prediction is performed once each time the encoder side sends a frame of picture. In an anti-tearing processing, the decoder side may put a successfully received sub-picture (including a base layer and an enhancement layer) into a buffer, to provide a reference for decoding a received subsequent picture frame.

The picture tearing problem occurs in the first picture, no picture tearing problem or a picture tearing problem may occur in the second picture, and a probability that a picture tearing problem continuously occurs between pictures is low. Therefore, displaying the second picture, instead of the first picture in which the picture tearing problem is to occur, within the display time period of the first picture when the picture tearing problem is to occur in the first picture can reduce a picture tearing probability, avoid the picture tearing problem of the first picture as much as possible, and improve picture quality of the entire video stream and video watching experience of a user.

In addition, for the first picture, when sending the earliest transmitted base layer of the 1st sub-picture of the first picture, the encoder side may determine, based on the base layer of the 1st sub-picture, whether picture tearing is to occur in the first picture, so as to perform anti-tearing processing as soon as possible in a timely manner when picture tearing is to occur, and reduce as much as possible a picture display delay caused by anti-tearing processing on the first picture.

Figure 9:
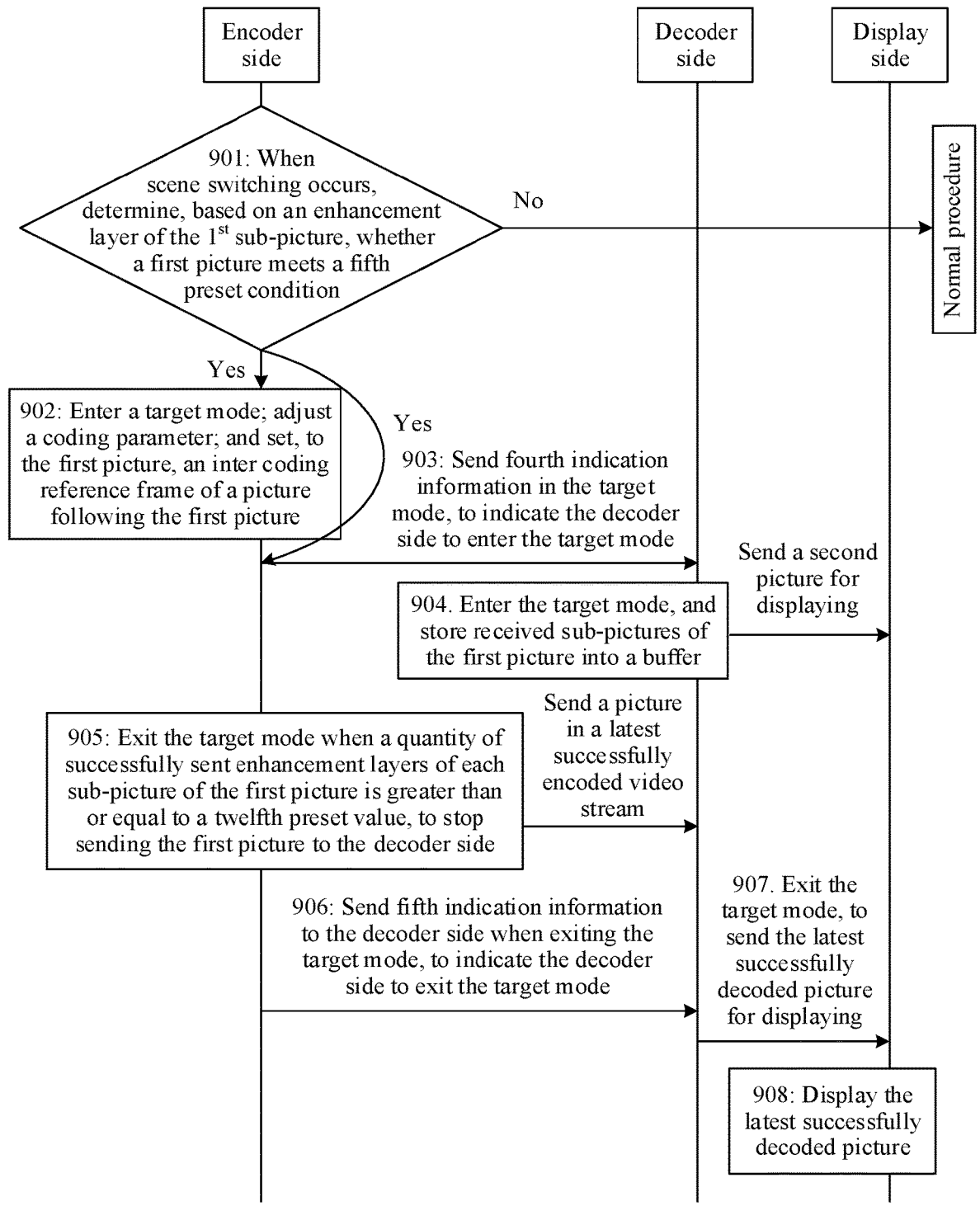
FIG. 9 a flowchart of still another picture processing method according to an embodiment of the present disclosure.

Another embodiment of the present disclosure provides another picture processing method in which an encoder side predicts whether a picture blurring problem is to occur. For example, refer to FIG. 9. The picture processing method may include steps 901 to 908.

It should be noted that a process of predicting, by the encoder side, whether a picture blurring problem is to occur and performing anti-blurring processing in steps 901 to 908 is similar to the process of predicting, by the decoder side, whether a picture blurring problem is to occur and performing anti-blurring processing in steps 407 to 415. For details, refer to related descriptions in steps 407 to 415. The following mainly provides supplementary descriptions of differences.

901: When scene switching occurs, the encoder side determines, based on an enhancement layer of the 1st sub-picture of a first picture, whether the first picture meets a fifth preset condition.

For descriptions of scene switching, refer to related descriptions in step 404. The fifth preset condition is used to predict whether a picture blurring problem is to occur in the first picture. To be specific, the encoder side predicts, based on the enhancement layer of the 1st sub-picture, whether the picture blurring problem is to occur in the first picture.

In some embodiments, the encoder side may predict, based on a current sending bit rate, an instantaneous bandwidth, an average bandwidth, or the like, whether picture blurring is to occur in the first picture.

For example, the fifth preset condition may include: a quantity of successfully sent enhancement layers of the 1st sub-picture of the first picture is less than or equal to a ninth preset value; or a ratio of an amount of encoded data at an enhancement layer that is of the 1st sub-picture of the first picture and that is successfully sent within seventh preset duration to a seventh channel bandwidth is greater than or equal to a tenth preset value, and a ratio of the amount of the encoded data at the enhancement layer that is of the 1st sub-picture of the first picture and that is successfully sent within the seventh preset duration to an eighth channel bandwidth is greater than or equal to an eleventh preset value. The seventh channel bandwidth is an average bandwidth within the seventh preset duration, the eighth channel bandwidth is an average bandwidth within the eighth preset duration, and the eighth preset duration is greater than the seventh preset duration.

If the quantity of enhancement layers that are of the 1st sub-picture of the first picture and that are successfully sent by the encoder side is less than or equal to the ninth preset value, it may indicate that the encoder side does not successfully send sufficient enhancement layers, quality of the first picture received by the decoder side is poor, and there is a low probability that sufficient enhancement layers of a subsequent sub-picture of the first picture are successfully sent. As a result, the encoder side predicts that a picture blurring phenomenon is to occur in the first picture.

The seventh preset duration is short, and may be understood as unit duration. The amount of the encoded data at the enhancement layer that is of the 1st sub-picture of the first picture and that is successfully sent within the seventh preset duration may be understood as a sending bit rate used after the enhancement layer of the 1st sub-picture of the first picture is encoded. The seventh channel bandwidth within the first preset duration may be understood as an instantaneous bandwidth, and the eighth channel bandwidth is an average bandwidth in a long time window corresponding to the eighth preset duration. For example, the seventh preset duration may be 4 ms, and the eighth preset duration may be 1 s. It should be understood that the time window corresponding to the seventh preset duration is located in the time window corresponding to the eighth preset duration. For example, the time window corresponding to the eighth preset duration may be obtained by extending, forward or backward along a time axis, the time window corresponding to the seventh preset duration. The tenth preset value and the eleventh preset value may be values less than 1 and close to 1, and the tenth preset value and the eleventh preset value may be the same or different.

When a ratio of the sending bit rate used after the enhancement layer of the 1st sub-picture is encoded to the instantaneous bandwidth is greater than or equal to the tenth preset value, and a ratio of the sending bit rate used after the enhancement layer of the 1st sub-picture is encoded to the average bandwidth is greater than or equal to the eleventh preset value, it may indicate that the amount of the encoded data at the enhancement layer of the 1st sub-picture is large. A current channel bandwidth is close to the sending bit rate, the current channel bandwidth may be insufficient to transmit all enhancement layers or sufficient enhancement layers of a subsequent sub-picture of the first picture, and the encoder side may be incapable of successfully sending all the enhancement layers or the sufficient enhancement layers of the subsequent sub-picture of the first picture. As a result, the encoder side predicts that a picture blurring problem is to occur in the first picture, and a picture blurring problem is also to occur in the subsequent picture.

In addition, the first preset duration, the third preset duration, the fifth preset duration, and the seventh preset duration may be the same or different. The second preset duration, the fourth preset duration, the sixth preset duration, and the eighth preset duration may be the same or different. This is not limited in this embodiment of this application.

902: If the first picture meets the fifth preset condition, the encoder side enters a target mode, and adjusts a coding parameter in the target mode, to reduce an amount of encoded data of another sub-picture following the 1st sub-picture of the first picture; set, to the first picture, an inter-coding reference frame of a picture following the first picture.

The target mode may be referred to as an anti-blurring mode. For descriptions of step 902, refer to step 409.

903: The encoder side sends fourth indication information to the decoder side in the target mode, to indicate the decoder side to enter the target mode.

When predicting, based on the fifth preset condition, that a picture blurring problem is to occur in the first picture, the encoder side may send the fourth indication information to the decoder side, so as to indicate the decoder side to enter an anti-blurring mode and perform a corresponding processing operation in the anti-blurring mode. For example, the fourth indication information may be an anti-blurring mode flag.

904: If the decoder side receives the fourth indication information from the encoder side, enter the target mode, send a second picture in the target mode for displaying, and store received sub-pictures of the first picture into a buffer.

The decoder side enters the anti-blurring mode if receiving the fourth indication information sent by the encoder side. In the anti-blurring mode, the decoder side continuously sends the second picture for displaying, so that a display side continuously displays the second picture.

905: The encoder side exits the target mode when a quantity of successfully sent enhancement layers of each sub-picture of the first picture is greater than or equal to a twelfth preset value, to stop sending the first picture to the decoder side and send a latest successfully encoded picture in the video stream to the decoder side.

The decoder side receives the first picture of good quality when the quantity of successfully sent enhancement layers of each sub-picture of the first picture is greater than or equal to the twelfth preset value. Therefore, the encoder side may exit the anti-blurring mode, to stop sending the first picture to the decoder side and send a latest successfully encoded picture to the decoder side for decoding.

Correspondingly, the decoder side receives the latest successfully encoded picture from the encoder side.

906: The encoder side sends fifth indication information to the decoder side when exiting the target mode, to indicate the decoder side to exit the target mode.

The encoder side may further send the fifth indication information to the decoder side when exiting the anti-blurring mode, to indicate the decoder side to exit the anti-blurring mode.

907: The decoder side exits the target mode after receiving the fifth indication information from the encoder side, to send a latest successfully decoded picture for displaying.

908: The display side displays the latest successfully decoded picture.

The latest successfully decoded picture is a picture corresponding to a current display time period. In steps 907 and 908, after exiting the anti-blurring mode, the decoder side sends the latest successfully decoded picture for displaying, so that the display side displays the latest successfully decoded picture.

In the solution described in steps 901 to 908, after predicting, based on the fifth preset condition, that picture blurring is to occur in the first picture, the encoder side may enable the anti-blurring mode, to continuously send the second picture in the anti-blurring mode for displaying, and exit the anti-blurring mode only after the first picture of good quality is received. The first picture may provide a good reference for encoding/decoding of a subsequent picture frame, reduce an amount of encoded data of the subsequent picture frame, make it easier to successfully transmit the encoded data of the subsequent picture frame to the decoder side for decoding, and avoid a problem that picture blurring occurs for a long period of time.

In addition, for the first picture, when sending the earliest transmitted 1st sub-picture of the first picture, the encoder side may determine, based on the enhancement layer of the 1st sub-picture, whether picture blurring is to occur in the first picture, so as to perform anti-blurring processing as soon as possible in a timely manner when picture blurring is to occur, and reduce as much as possible a picture display delay caused by anti-blurring processing on the first picture.

In other words, in the solution described in steps 901 to 908, during scene switching, the encoder side may predict a receiving/loss status of a subsequent sub-picture of the 1st sub-picture of the first picture based on related information of the base layer or the enhancement layer of the 1st sub-picture and channel bandwidth statistics information, and adjust a coding, transmission, and display strategy based on a prediction result, to improve picture quality problems such as picture blurring and display the complete high-quality picture as much as possible.

The picture processing method provided in the foregoing embodiment may also be understood as a sub-picture loss prediction method in a sub-frame-level picture processing system and a displaying method based on a prediction result.

During sub-frame-level low-delay projection, if a base layer with a large bit rate occurs due to picture quality requirements and picture properties, and a channel bandwidth is low, a picture tearing problem occurs. In addition, if the channel bandwidth is continuously low, a problem that picture quality is low for a long period of time and that is very prone to be observed occurs in a still scene present after scene switching. In addition, because a current picture lacks a reference during scene switching, bit streams of both a base layer and an enhancement layer increase significantly. In this way, a possibility of transmission loss greatly increases. In addition, a picture tearing problem that occurs during scene switching is more prone to be observed than a picture tearing problem in a continuous moving scene, and consequently has stronger impact on subjective feelings.

According to the picture processing method provided in this embodiment of this application, a receiving/loss status of a subsequent sub-picture of a frame of picture in a sub-frame-level system is predicted based on information about the 1st sub-picture of the frame of picture and channel bandwidth statistics information, and a coding, transmission, and display strategy is adjusted based on a prediction result, to improve picture quality problems such as picture tearing and long-term low-quality picture. This method temporarily increases a delay within a short period of time (the delay decreases to a normal value after an effective range of the solutions of the present disclosure ends). However, considering that a delay at a high frame rate is less prone to be observed than tearing and long-term low picture quality, the present disclosure can significantly improve subjective feelings.

According to the picture processing method provided in this embodiment of this application, picture tearing detection/prediction is performed on the 1st sub-picture. This can significantly reduce picture tearing cases without increasing a picture in which no tearing problem occurs, and finally significantly improve subjective effect of a displayed picture. Picture blurring detection/prediction is performed on the 1st sub-picture. In this way, a high-quality picture can be provided during scene switching without adding a picture in which no blurring problem occurs, and a good reference can be provided for inter-coding a subsequent frame. In addition, long-term picture blurring after scene switching can be effectively reduced in the case of a low bandwidth, and subjective effect of the displayed picture is finally significantly improved. Thus, the method can provide significantly improved prediction results at a negligible computational cost. Resulting false detection is very limited and has little subjective effect on quality of the final picture.

In addition, in this embodiment of this application, detection and prevention processing of picture quality problems such as picture tearing and picture blurring may be implemented at a software layer. Therefore, detection and prevention processing may be implemented on an existing device through software update without modifying hardware. In this way, high forward compatibility.

It may be understood that, to implement the foregoing functions, the picture processing apparatus includes corresponding hardware and/or a corresponding software module for performing each function. With reference to algorithm steps of each example described in embodiments disclosed in this specification, the present disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments of this application, the picture processing apparatus may be divided into functional modules based on the foregoing method examples. For example, each functional module may be obtained through division based on a corresponding function, or two or more functions may be integrated into one processing module. The integrated module may be implemented in a form of hardware. It should be noted that, in embodiments, division into the modules is an example and is merely logical function division. During actual implementation, another division manner may be used.

Figure 10:
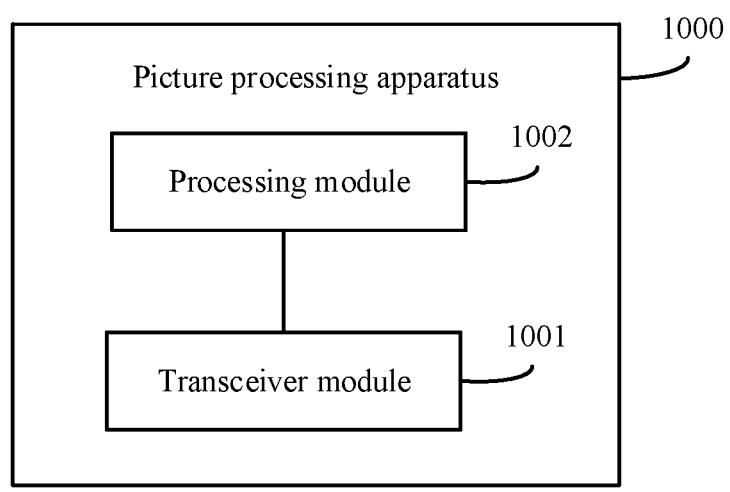
FIG. 10 is a schematic diagram of a structure of a picture processing apparatus according to an embodiment of the present disclosure.

For example, when each functional module is obtained through division based on a corresponding function, FIG. 10 is a possible schematic composition diagram of the picture processing apparatus 1000 in the foregoing embodiment. As shown in FIG. 10, the picture processing apparatus 1000 may include a transceiver module 1001 and a processing module 1002.

In some embodiments, the picture processing apparatus is an encoder-side device or is located on an encoder-side device. The transceiver module 1001 may be configured to support the picture processing apparatus 1000 to perform step 413 shown in FIG. 4B in the foregoing embodiment, and/or another action or function performed by the encoder-side device in the foregoing method embodiment. The processing module 1002 may be configured to support the picture processing apparatus 1000 to perform step 409 and step 413 shown in FIG. 4B in the foregoing embodiment, and/or another action or function performed by the encoder-side device in the foregoing method embodiment.

In some other embodiments, the picture processing apparatus is a decoder-side device or is located on a decoder-side device. The transceiver module 1001 may be configured to support the picture processing apparatus 1000 to perform step 402, step 405, step 408, step 410, step 412, and step 414 shown in FIG. 4A and FIG. 4B in the foregoing embodiment, and/or another action or function performed by the decoder-side device in the foregoing method embodiment. The processing module 1002 may be configured to support the picture processing apparatus 1000 to perform step 401, step 404, step 407, and step 410 shown in FIG. 4A and FIG. 4B in the foregoing embodiment, and/or another action or function performed by the decoder-side device in the foregoing method embodiment.

All related content of the steps in the foregoing method embodiments may be cited in function descriptions of the corresponding functional modules.

Alternatively, in some other embodiments, the picture processing apparatus is an encoder-side device or is located on an encoder-side device. The transceiver module 1001 may be configured to support the picture processing apparatus 1000 to perform step 802 shown in FIG. 8 in the foregoing embodiment, step 903, step 905, and step 906 shown in FIG. 9, and/or another action or function performed by the encoder-side device in the foregoing method embodiment. The processing module 1002 may be configured to support the picture processing apparatus 1000 to perform step 801 shown in FIG. 8 in the foregoing embodiment, step 901 and step 902 shown in FIG. 9, and/or another action or function performed by the encoder-side device in the foregoing method embodiment.

In some other embodiments, the picture processing apparatus is a decoder-side device or is located on a decoder-side device. The transceiver module 1001 may be configured to support the picture processing apparatus 1000 to perform step 803 shown in FIG. 8 in the foregoing embodiment, step 904 and step 907 shown in FIG. 9, and/or another action or function performed by the decoder-side device in the foregoing method embodiment. The processing module 1002 may be configured to support the picture processing apparatus 1000 to perform step 904 in FIG. 9 in the foregoing embodiment, and/or another action or function performed by the decoder-side device in the foregoing method embodiment.

All related content of the steps in the foregoing method embodiments may be cited in function descriptions of the corresponding functional modules.

In this embodiment of this application, the picture processing apparatus 1000 is presented in a form of functional modules obtained through division in an integrated manner. The "module" herein may be an ASIC, a circuit, a processor that executes one or more software or firmware programs, a memory, an integrated logic circuit, and/or another component capable of providing the foregoing functions. In a simple embodiment, a person skilled in the art may figure out that the picture processing apparatus 1000 may be in a form shown in FIG. 3A.

For example, the processor 301 in FIG. 3A may invoke the computer instructions stored in the memory 303, to enable the picture processing apparatus 1000 to perform the actions performed by the terminal device in the foregoing method embodiments.

Specifically, functions/implementation processes of the transceiver module 1001 and the processing module 1002 in FIG. 10 may be performed by the processor 301 in FIG. 3A by invoking the computer-executable instructions stored in the memory 303. Alternatively, functions/implementation processes of the transceiver module 1001 in FIG. 10 may be performed by the transmission interface 302 in FIG. 3A, and functions/implementation processes of the processing module 1002 in FIG. 10 may be performed by the processor 301 in FIG. 3A by invoking the computer instructions stored in the memory 303.

Optionally, an embodiment of the present disclosure further provides a computer-readable storage medium. The computer-readable storage medium stores computer instructions. When the computer instructions are run on a picture processing apparatus, the picture processing apparatus is enabled to perform the foregoing related method steps, to implement the picture processing method in the foregoing embodiments. For example, the picture processing apparatus may be the encoder-side device in the foregoing method embodiments. Alternatively, the communication apparatus may be the decoder-side device in the foregoing method embodiments.

Optionally, an embodiment of the present disclosure further provides a computer program product. When the computer program product runs on a computer, the computer is enabled to perform the foregoing related steps, to implement the picture processing method performed by the picture processing apparatus in the foregoing embodiments. For example, the picture processing apparatus may be the encoder-side device in the foregoing method embodiments. Alternatively, the picture processing apparatus may be the decoder-side device in the foregoing method embodiments.

Optionally, an embodiment of the present disclosure further provides a picture processing apparatus. The picture processing apparatus may be specifically a chip, a component, a module, or a system-on-a-chip. The apparatus may include a processor and a memory that are connected to each other. The memory is configured to store computer instructions. When the apparatus runs, the processor may execute the computer instructions stored in the memory, to enable the chip to perform the picture processing method performed by the communication apparatus in the foregoing method embodiments. For example, the picture processing apparatus may be the encoder-side device in the foregoing method embodiments. Alternatively, the picture processing apparatus may be the decoder-side device in the foregoing method embodiments.

Optionally, an embodiment of the present disclosure further provides a picture processing system. The picture processing system includes an encoder-side device and a decoder-side device. The encoder-side device and the decoder-side device in the picture processing system may separately perform the picture processing methods performed by the encoder-side device and the decoder-side device in the foregoing embodiments. For example, for a schematic architectural diagram of the picture processing system, refer to FIG. 2.

The picture processing apparatus, the computer-readable storage medium, the computer program product, the chip, or the system-on-chip provided in embodiments of the present disclosure is configured to perform the corresponding method provided above. Therefore, for beneficial effects that can be achieved by the picture processing apparatus, the computer-readable storage medium, the computer program product, the chip, or the system-on-chip, refer to beneficial effects in the corresponding method provided above.

Based on descriptions about the foregoing implementations, a person skilled in the art may understand that, for a purpose of convenient and brief description, division into the foregoing functional modules is used as an example for illustration. During actual application, the foregoing functions may be allocated to different functional modules and implemented based on requirements. In other words, an inner structure of an apparatus is divided into different functional modules to implement all or a part of the functions described above.

In the several embodiments provided in this application, it should be understood that the disclosed apparatus and method may be implemented in other manners. For example, the apparatus embodiments described above are merely examples. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. A part or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of the present disclosure essentially, or the part contributing to some embodiments, or all or a part of the technical solutions may be implemented in a form of a software product. The software product is stored in a storage medium and includes several instructions for instructing a device (which may be a single-chip microcomputer, a chip, or the like) or a processor to perform all or a part of the steps of the methods described in embodiments of this application. The foregoing storage medium includes any medium that can store program code, such as a universal serial bus (USB) flash drive, a removable hard disk, a ROM, a RAM, a magnetic disk, or an optical disc.

The foregoing content is merely specific implementations of this application, but is not intended to limit the protection scope of this application. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A picture processing method comprising:
receiving a first picture and a second picture in a video stream, wherein the first picture has a first display time period and the second picture has a second display time period after the first display time period, and wherein each picture in the video stream comprises a plurality of sub-pictures, and wherein each sub-picture comprises a base layer;
sending the first picture for displaying the first picture during the first display time period;
determining whether the second picture meets a first preset condition based on a base layer of a first sub-picture of the second picture;
sending, when the second picture meets the first preset condition, the first picture for displaying the first picture again during the second display time period;
determining, when scene switching occurs, whether the second picture meets a second preset condition based on the base layer of the first sub-picture of the second picture; and
sending, when the second picture meets the second preset condition, the first picture for displaying the first picture again during the second display time period.

2. The picture processing method of claim 1, wherein the first preset condition comprises the base layer of the first sub-picture of the second picture is lost or partially lost.

3. The picture processing method of claim 1, wherein the first sub-picture is an initial sub-picture of the second picture.

4. The picture processing method of claim 1, wherein the second preset condition comprises a first ratio of an amount of encoded data at the base layer of the first sub-picture of the second picture received within a first preset duration to a first channel bandwidth is greater than or equal to a first preset value and a second ratio of the amount of the encoded data at the base layer of the first sub-picture of the second picture received within the first preset duration to a second channel bandwidth is greater than or equal to a second preset value, wherein the first channel bandwidth is a first average bandwidth within the first preset duration, wherein the second channel bandwidth is a second average bandwidth within a second preset duration, wherein the second preset duration is greater than the first preset duration, and wherein the second preset duration is based on extending the first preset duration forward or backward along a time axis.

5. The picture processing method of claim 1, wherein each of the sub-pictures in the plurality of sub-pictures further comprises at least one enhancement layer, and wherein the picture processing method further comprises:
determining, when scene switching occurs, whether the second picture meets a second preset condition based on an enhancement layer of the first sub-picture of the second picture; and
entering, when the second picture meets the second preset condition, a target mode and sending the first picture for displaying the first picture again during the second display time period, and storing received sub-pictures of the second picture into a buffer.

6. The picture processing method of claim 5, wherein the second preset condition comprises:
a quantity of received enhancement layers of the first sub-picture of the second picture is less than or equal to a first preset value; or
a first ratio of an amount of encoded data at an enhancement layer of the first sub-picture of the second picture received within a first preset duration to a first channel bandwidth is greater than or equal to a second preset value and a second ratio of the amount of the encoded data at the enhancement layer of the first sub-picture of the second picture received within the first preset duration to a second channel bandwidth is greater than or equal to a fifth preset value, wherein the first channel bandwidth is a first average bandwidth within the first preset duration, wherein the second channel bandwidth is a second average bandwidth within second preset duration, wherein the second preset duration is greater than the first preset duration, and wherein the second preset duration is obtained by extending the first preset duration forward or backward along a time axis.

7. The picture processing method of claim 5, further comprising sending, when the target mode is entered, first indication information to an encoder side to indicate to the encoder side to enter the target mode.

8. The picture processing method of claim 7, further comprising:
exiting the target mode to send a latest successfully decoded picture for displaying when a quantity of received enhancement layers of each of the sub-pictures of the second picture is greater than or equal to a first preset value; and
sending second indication information to the encoder side to indicate to the encoder side to exit the target mode.

9. A picture processing method comprising:
receiving first indication information from a decoder side during a process of sending a first picture in a video stream to the decoder side;
entering a target mode in response to the first indication information;

adjusting a coding parameter in the target mode to reduce an amount of encoded data of a second sub-picture following a first sub-picture of the first picture;
setting an inter-coding reference frame of a second picture following the first picture to the first picture;
receiving second indication information from the decoder side;
exiting the target mode in response to the second indication information;
terminating sending of the first picture to the decoder side in response to exiting the target mode; and
sending a latest successfully encoded picture in the video stream to the decoder side.

10. A picture processing method comprising:
determining, when scene switching occurs, whether a second picture in a video stream meets a first preset condition based on a base layer of a first sub-picture of the second picture, wherein each picture in the video stream comprises a plurality of sub-pictures, and wherein each sub-picture comprises a base layer and at least one enhancement layer;
sending first indication information to a decoder side when the second picture meets the first preset condition to indicate to the decoder side to send a second picture within a second display time period of the second picture for displaying the second picture again, wherein the second picture is a picture in the video stream that is sent for displaying within a second display time period prior to the second display time period;
determining, when scene switching occurs, whether the second picture meets a second preset condition based on an enhancement layer of the first sub-picture of the second picture;
entering a target mode when the second picture meets the second preset condition, and sending second indication information to the decoder side in the target mode to indicate to the decoder side to enter the target mode;
adjusting a coding parameter in the target mode to reduce a first amount of encoded data of a second sub-picture following the first sub-picture in the second picture; and
setting an inter-coding reference frame of a third picture following the second picture to the second picture.

11. The picture processing method of claim 10, wherein the first preset condition comprises: a first ratio of an amount of encoded data at the base layer of the first sub-picture of the second picture that is successfully sent within a first preset duration to a first channel bandwidth is greater than a first preset value, and a second ratio of the amount of the encoded data at the base layer of the first sub-picture of the second picture that is successfully sent within the first preset duration to a second channel bandwidth is greater than an second preset value, wherein the first channel bandwidth is a first average bandwidth within the first preset duration, the second channel bandwidth is a second average bandwidth within a second preset duration, wherein the second preset duration is greater than the first preset duration, and the second preset duration is obtained by extending the first preset duration forward or backward along a time axis.

12. The picture processing method of claim 10, wherein the first sub-picture is an initial sub-picture of the second picture.

13. The picture processing method of claim 12, wherein the second preset condition comprises:
a quantity of successfully sent enhancement layers of the first sub-picture of the second first picture is less than or equal to a first preset value; or
a first ratio of a second amount of encoded data at an enhancement layer of the first sub-picture of the second picture that is successfully sent within a first preset duration to a first channel bandwidth is greater than or equal to a second preset value, and a second ratio of the second amount of the encoded data at the enhancement layer of the first sub-picture of the second picture that is successfully sent within the first preset duration to a second channel bandwidth is greater than or equal to a third preset value, wherein the first channel bandwidth is a first average bandwidth within the first preset duration, the second channel bandwidth is a second average bandwidth within second preset duration, wherein the second preset duration is greater than the first preset duration, and the second preset duration is obtained by extending the first preset duration forward or backward along a time axis.

14. The picture processing method of claim 13, further comprising:
exiting the target mode when a quantity of successfully sent enhancement layers of each sub-picture of the second picture is greater than or equal to a twelfth preset value;
terminating sending of the second picture to the decoder side in response to exiting the target mode and sending a latest successfully encoded picture in the video stream to the decoder side; and
sending third indication information to the decoder side to indicate to the decoder side to exit the target mode.

15. A picture processing method comprising:
receiving first indication information from an encoder side during a process of receiving a second picture in a video stream from the encoder side;
sending a first picture within a second display time period of the second picture for displaying the first picture in response to the first indication information, wherein the first picture is a picture in the video stream that is also sent within a first display time period for displaying the first picture, and wherein the second display time period is after the first display time period;
receiving second indication information from the encoder side;
entering a target mode in response to the second indication information;
sending the first picture in the target mode for displaying the first picture, and storing received sub-pictures of the second picture into a buffer;
receiving third indication information from the encoder side;
exiting the target mode in response to the third indication information; and
sending a latest successfully decoded picture for displaying the a latest successfully decoded picture in response to exiting the target mode.

16. The picture processing method of claim 15, wherein the second indication information is an anti-blurring mode flag.

17. A picture processing apparatus comprising:
a memory configured to store instructions; and
a processor coupled to the memory and configured to execute the instructions to cause the picture processing apparatus to:
receive a first picture and a second picture in a video stream, wherein the first picture has a first display time period and the second picture has a second display time period after the first display time period, and wherein each picture in the video stream comprises a plurality of sub-pictures, and wherein each sub-picture comprises a base layer;

determine whether the second picture meets a first preset condition based on a base layer of a first sub-picture of the second picture;

send the first picture within the second display time period for displaying the first picture when the second picture meets the first preset condition, wherein the first picture is also sent within the first display time period for displaying the first picture;

determine, when scene switching occurs, whether the second picture meets a second preset condition based on the base layer of the first sub-picture of the second picture; and send the first picture within the second display time period of the second picture for displaying the first picture when the second picture meets the second preset condition.

18. The picture processing apparatus of claim 17, wherein the first preset condition comprises the base layer of the first sub-picture of the second picture is lost or partially lost.

19. The picture processing apparatus of claim 17, wherein the first sub-picture is an initial sub-picture of the second picture.

20. The picture processing apparatus of claim 19, wherein the second preset condition comprises: a first ratio of an amount of encoded data at the base layer of the first sub-picture of the second picture that is received within a first preset duration to a first channel bandwidth is greater than or equal to a first preset value, and a second ratio of the amount of the encoded data at the base layer of the first sub-picture of the second picture that is received within the first preset duration to a second channel bandwidth is greater than or equal to a second preset value, wherein the first channel bandwidth is a first average bandwidth within the first preset duration, the second channel bandwidth is a second average bandwidth within second preset duration, wherein the second preset duration is greater than the first preset duration, and the second preset duration is obtained by extending the first preset duration forward or backward along a time axis.

* * * * *